United States Patent [19]

Sakurai et al.

[11] Patent Number: 5,586,172
[45] Date of Patent: Dec. 17, 1996

[54] TELEPHONE EXCHANGE SYSTEM

[75] Inventors: Shigeki Sakurai; Yoshihiro Tanigawa, both of Yokohama; Masatomo Ohuchi, Kawasaki; Shoji Suzuki, Atsugi; Katsuhiro Kakizawa, Kawasaki; Kuniaki Ohtsuka, Yokohama, all of Japan

[73] Assignee: Canon Kabushiki Kaisha, Tokyo, Japan

[21] Appl. No.: 309,968

[22] Filed: Sep. 20, 1994

Related U.S. Application Data

[63] Continuation of Ser. No. 76,945, Jun. 16, 1993, abandoned, which is a continuation of Ser. No. 658,400, Feb. 20, 1991, abandoned.

[30] Foreign Application Priority Data

| Feb. 23, 1990 | [JP] | Japan | 2-42901 |
| Feb. 23, 1990 | [JP] | Japan | 2-42902 |
| Feb. 23, 1990 | [JP] | Japan | 2-42903 |
| Feb. 28, 1990 | [JP] | Japan | 2-49036 |
| Mar. 5, 1990 | [JP] | Japan | 2-53256 |
| Mar. 6, 1990 | [JP] | Japan | 2-54396 |
| Apr. 4, 1990 | [JP] | Japan | 2-90025 |

[51] Int. Cl.$^6$ .................................................. H04M 1/64
[52] U.S. Cl. ........................... 379/67; 379/70; 379/102; 379/156
[58] Field of Search .................................. 379/67, 88, 89, 379/70, 79, 80, 211, 210, 200, 102, 212, 100, 157, 165, 156

[56] References Cited

U.S. PATENT DOCUMENTS

| 4,602,129 | 7/1986 | Matthews et al. | 379/67 |
| 4,625,081 | 11/1986 | Lotito | 379/88 |
| 4,829,556 | 5/1989 | Hashimoto | 379/70 |
| 4,837,807 | 6/1989 | Szeto et al. | 379/210 |
| 4,853,952 | 8/1989 | Jachmann et al. | 379/89 |
| 4,926,462 | 5/1990 | Ladd et al. | 379/67 |
| 4,975,896 | 12/1990 | D'Agosto, III, et al. | 379/88 |
| 5,003,575 | 3/1991 | Chamberlin et al. | 379/89 |
| 5,172,404 | 12/1992 | Hashimoto | 379/89 |

FOREIGN PATENT DOCUMENTS

| 0112967 | 7/1984 | European Pat. Off. . |
| 0255325 | 2/1988 | European Pat. Off. . |
| 59-28747 | 5/1984 | Japan . |
| WO8808654 | 11/1988 | WIPO . |

OTHER PUBLICATIONS

The Bell System Technical Journal, vol. 61, No. 5, May/Jun. 1982, pp. 863–883, American Telephone and Telegraph Co., Murray Hill, N.J., US; G. W. Gates et al.: "1A Voice storage system: Software".

Computer Communications, vol. 8, No. 3, Jun. 1985, pp. 115–120, Guildford Surrey, GB; S. Newton: "Voice messaging systems".

"A Centralized Approach To New Network Services" by R. G. Cornell et al. Conference Record, Int'l. Conference on Communications; vol. 1, 10–14th Jun. 1979, pp. 3.3.1–3.3.7, IEEE, Boston, US.

"Managing Stored Voice In The Etherphone System" by D. B. Terry et al. Operating Systems Review, vol. 21, No. 5, 8th–11th Nov. 1987, pp. 103–104, New York, US.

"1A Voice Storage System: Software" by G. W. Gates et al. The Bell System Technical Journal vol. 61, No. 5 May/Jun. 1982 pp. 363–883, American Telephone and Telegraph Company, Murray Hill, New Jersey, US.

*Primary Examiner*—Jeffery Hofsass
*Assistant Examiner*—Fan Tsang
*Attorney, Agent, or Firm*—Fitzpatrick, Cella, Harper & Scinto

[57] ABSTRACT

A telephone exchange system accommodates a plurality of central office lines and a plurality of telephones and records a telephonic communication in a recording area shared by the plurality of telephones. When predetermined conditions are satisfied, the recording is played back or transferred. The shared recording area can be utilized effectively by erasing a recording after it has been transferred, and by detecting the presence of a voice during a telephonic communication and starting and stopping the recording operation based upon the results of detection. The time at which a recording has been made can be comprehended in the form of a voice when the recording is played back.

43 Claims, 25 Drawing Sheets

| BLK NO. | STATUS OF USE | POSSESSOR | MSG NO. |
|---|---|---|---|
| 0 | 1 | | |
| 1 | 1 | 10 | 01 |
| 2 | 1 | | |
| 3 | 1 | | |
| 4 | 1 | 11 | 01 |
| 5 | 1 | | |
| 6 | 1 | 11 | 02 |
| 7 | 1 | | |
| 8 | 0 | BLANK | |
| 9 | 0 | | |
| 10 | 1 | 13 | 01 |
| 11 | 1 | | |
| 12 | 0 | BLANK | |
| 13 | 0 | | |
| 14 | 0 | | |
| 15 | 0 | | |

TBL-B

F I G. 3B

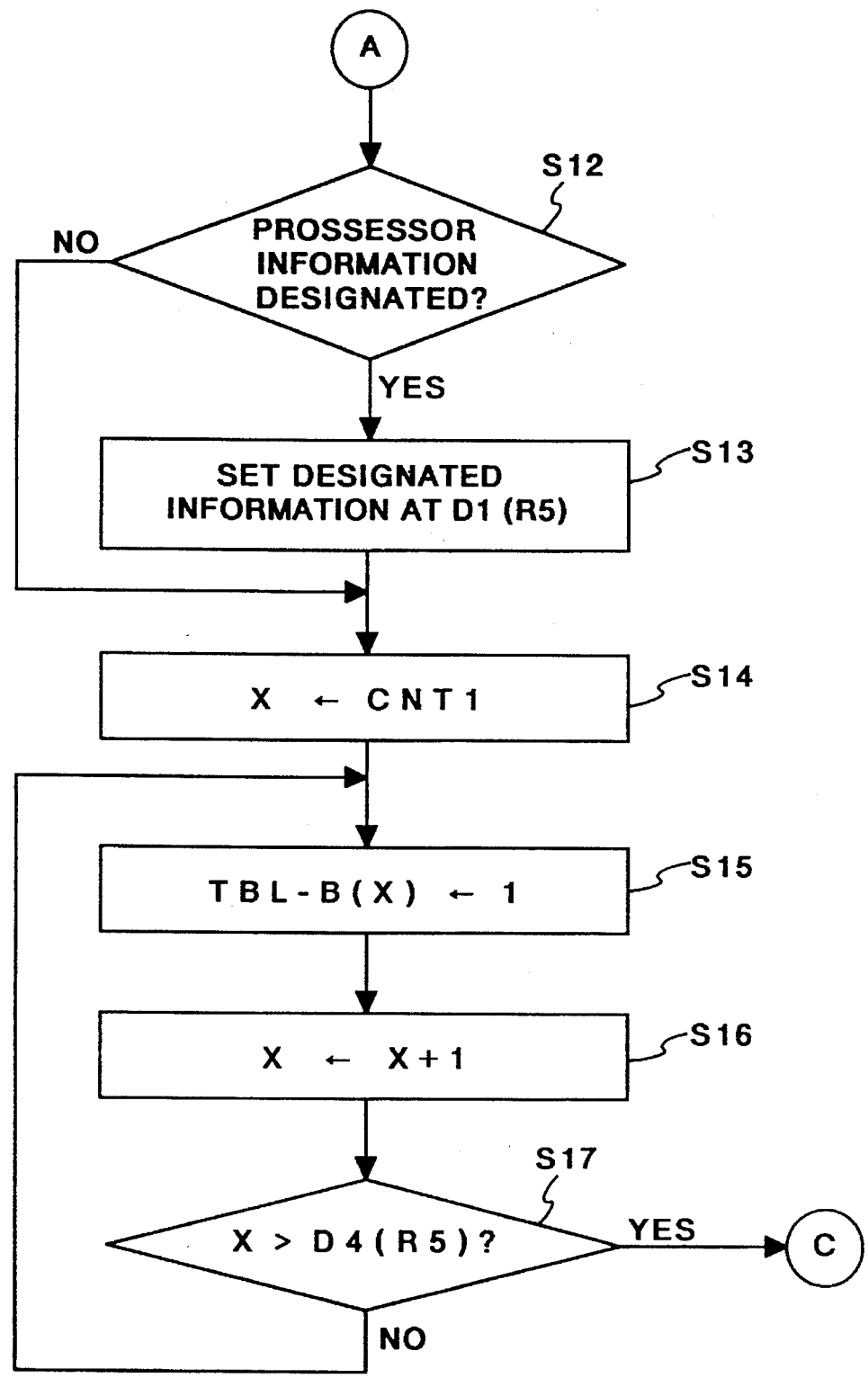
F I G. 4B

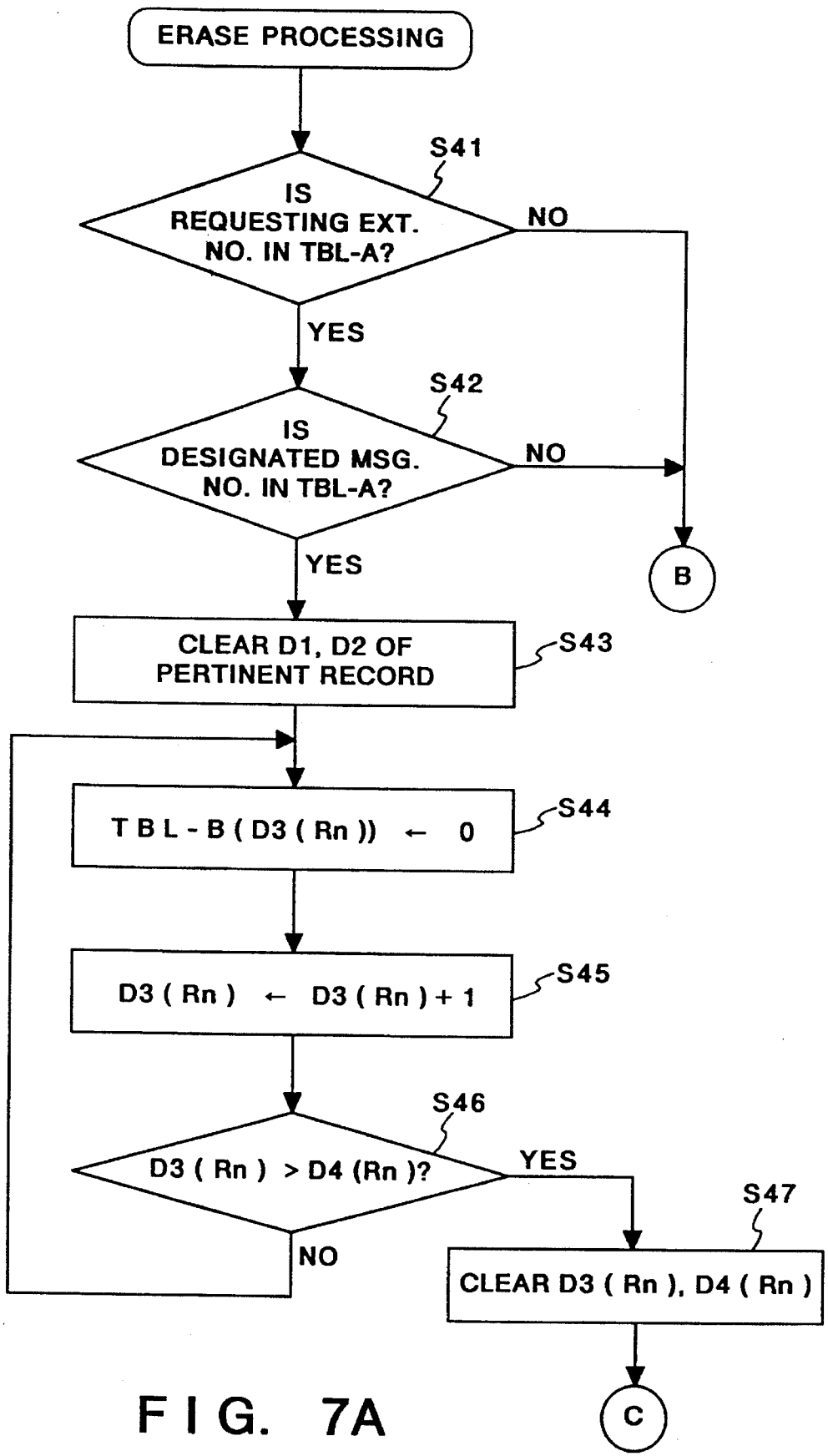
F I G. 7A

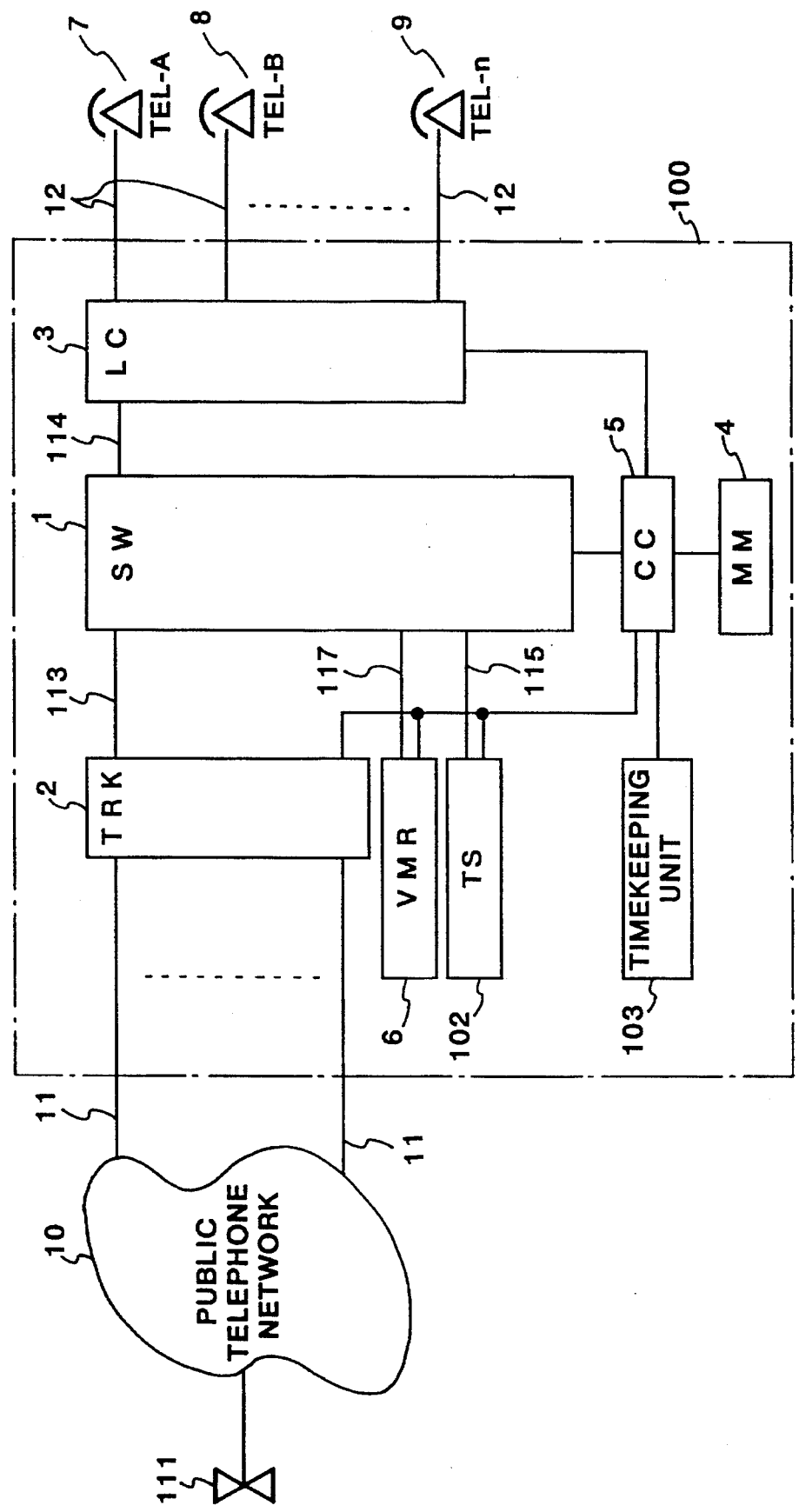
F I G. 13

| ADDRESS | | TIME SLOT NO. |
|---|---|---|
| 1n | 0 (CODE FOR PRONOUNCING "ZERO") | 0 |
| 2n | 1 (CODE FOR PRONOUNCING "ONE") | 1 |
| 3n | 2 (CODE FOR PRONOUNCING "TWO") | 2 |
| 4n | 3 (CODE FOR PRONOUNCING "THREE") | 3 |
| 5n | 4 (CODE FOR PRONOUNCING "FOUR") | 4 |
| 6n | 5 (CODE FOR PRONOUNCING "FIVE") | 5 |
| 7n | 6 (CODE FOR PRONOUNCING "SIX") | 6 |
| 8n | 7 (CODE FOR PRONOUNCING "SEVEN") | 7 |
| 9n | 8 (CODE FOR PRONOUNCING "EIGHT") | 8 |
| 10n | 9 (CODE FOR PRONOUNCING "NINE") | 9 |
| 11n | 10 (CODE FOR PRONOUNCING "TEN") | 10 |
| 12n | 11 (CODE FOR PRONOUNCING "ELEVEN") | 11 |
| 13n | 12 (CODE FOR PRONOUNCING "TWELVE") | 12 |
| 14n | 13 (CODE FOR PRONOUNCING "THIRTEEN") | 13 |
| 15n | 14 (CODE FOR PRONOUNCING "FOURTEEN") | 14 |
| 16n | 15 (CODE FOR PRONOUNCING "FIFTEEN") | 15 |
| 17n | 16 (CODE FOR PRONOUNCING "SIXTEEN") | 16 |
| 18n | 17 (CODE FOR PRONOUNCING "SEVENTEEN") | 17 |
| 19n | 18 (CODE FOR PRONOUNCING "EIGHTEEN") | 18 |
| 20n | 19 (CODE FOR PRONOUNCING "NINETEEN") | 19 |
| 21n | 20 (CODE FOR PRONOUNCING "TWENTY") | 20 |
| 22n | 30 (CODE FOR PRONOUNCING "THIRTY") | 21 |
| 23n | 40 (CODE FOR PRONOUNCING "FORTY") | 22 |
| 24n | 50 (CODE FOR PRONOUNCING "FIFTY") | 23 |
| 25n | A. M. (CODE FOR PRONOUNCING "A. M.") | 24 |
| 26n | P. M. (CODE FOR PRONOUNCING "P. M.") | 25 |

FIG. 14

| ADDRESS | | |
|---|---|---|
| 1n | 10 (CODE FOR PRONOUNCING "TEN") | TIME STAMP |
| 2n | 5 (CODE FOR PRONOUNCING "FIVE") | |
| 3n | A. M. (CODE FOR PRONOUNCING "A. M.") | |
| m | (CODE CORRESPONDING TO CONTENTS OF CONVERSATION) | |
| $m + l_1$ | (CODE CORRESPONDING TO CONTENTS OF CONVERSATION) | |
| $m + l_2$ | (CODE CORRESPONDING TO CONTENTS OF CONVERSATION) | |
| $m + l_3$ | (CODE CORRESPONDING TO CONTENTS OF CONVERSATION) | |
| $m + l_4$ | (CODE CORRESPONDING TO CONTENTS OF CONVERSATION) | |

FIG. 16

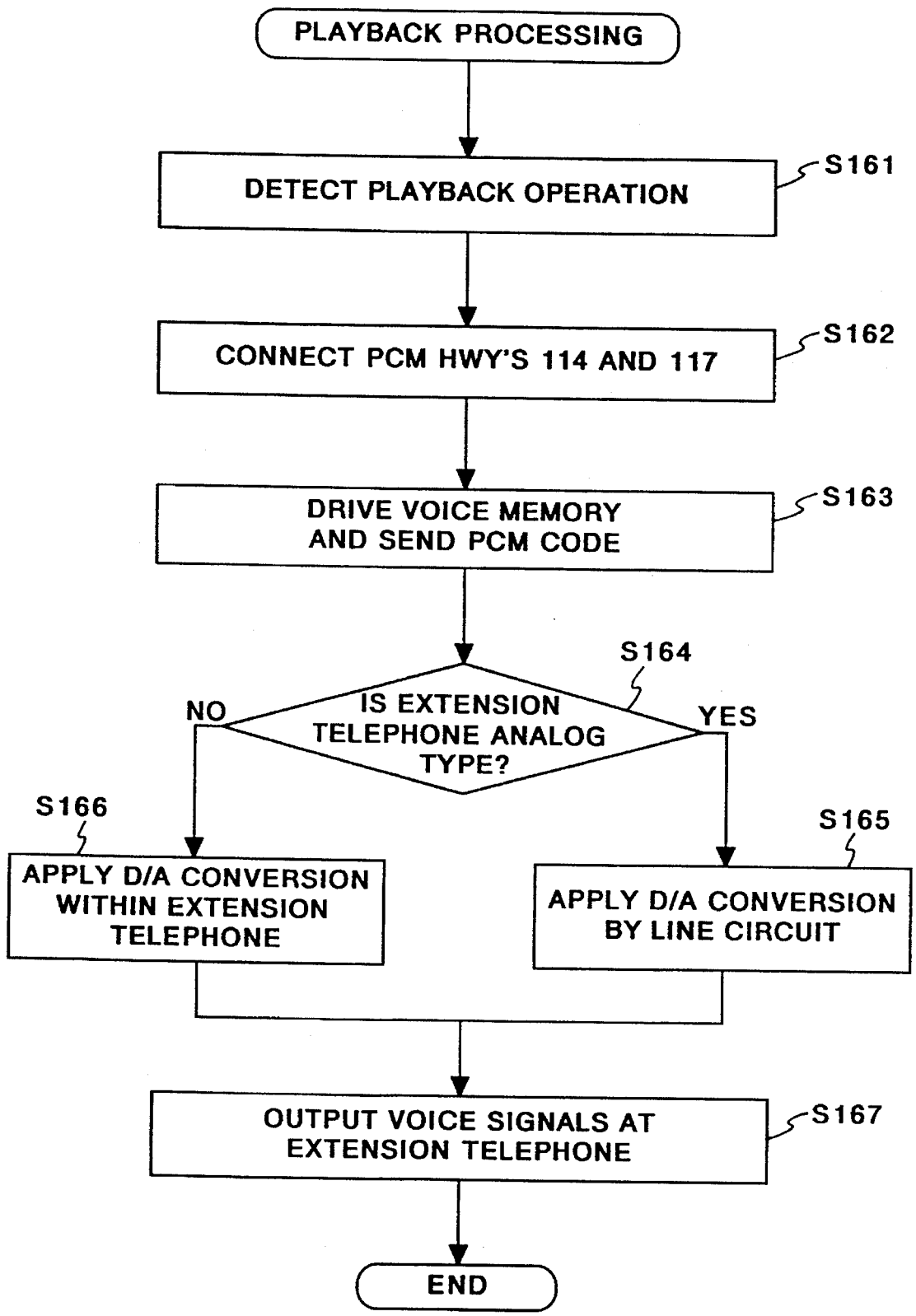
F I G. 17

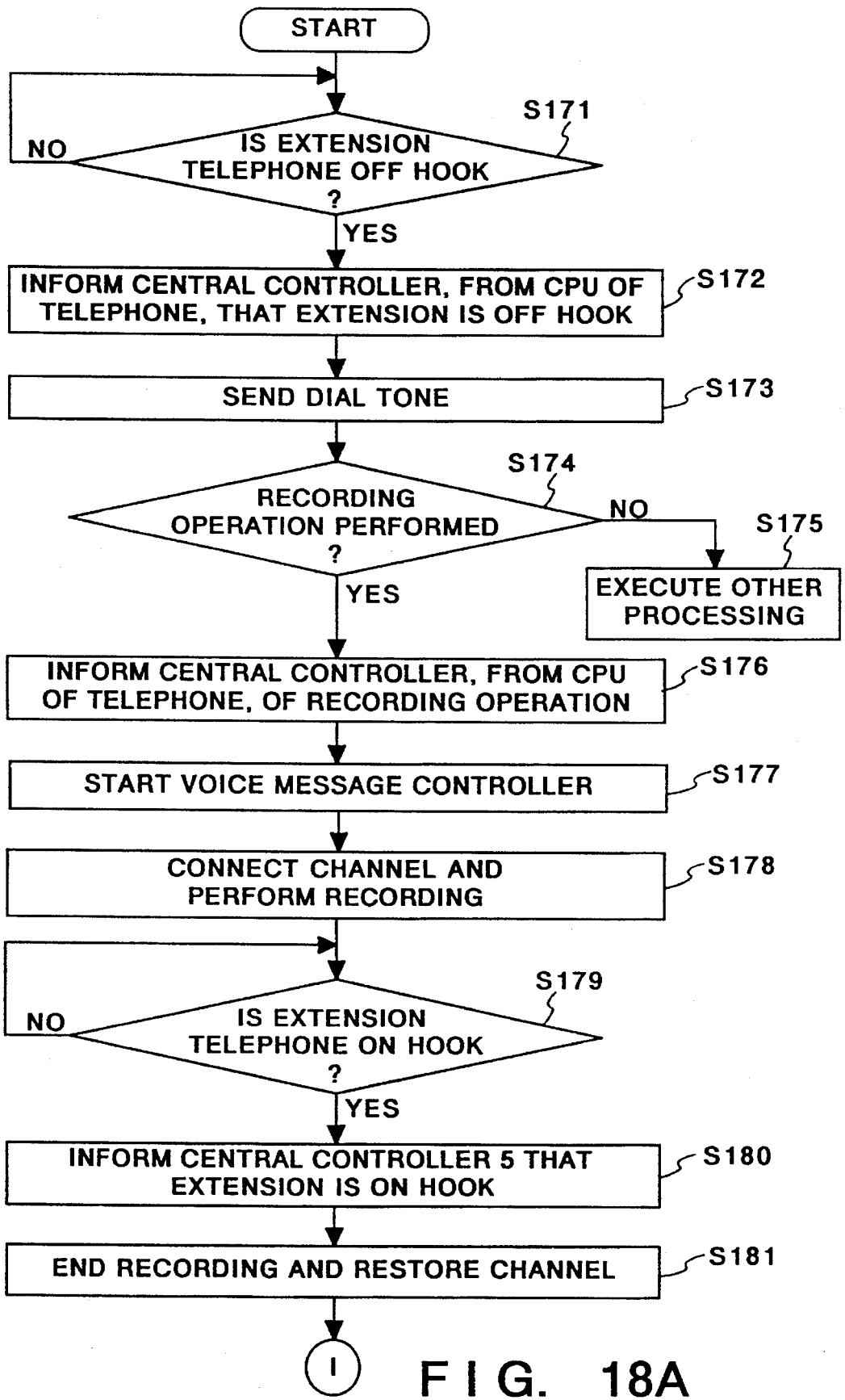
F I G. 18A

TELEPHONE EXCHANGE SYSTEM

This application is a continuation of application Ser. No. 08/076,945 filed Jun. 16, 1993 now abandoned, which is a continuation of application Ser. No. 07/658,400, filed Feb. 20, 1991, now abandoned.

FIELD OF THE INVENTION

This invention relates to a telephone exchange system which accommodates a plurality of main lines and a plurality of telephones. More particularly, the invention relates to a telephone exchange system in which the audio of a telephonic communication is recorded in a recording area shared by a plurality of telephones, and the recorded audio is played back by any of the telephones or transferred.

BACKGROUND OF THE INVENTION

In a conventional telephone exchange system, telephones each having a recording/playback function are used as extension telephones connected to the system in order to record the audio of a telephonic communication that is in progress. This makes it possible for each extension to individually record and/or playback the audio of the communication. In another conventional telephone exchange system, the system is provided with a memory device shared by each extension telephone, the storage area of the memory device is divided among the extensions, and a telephonic communication is recorded in or played back from an area that has been designated from an extension telephone by an operation performed at this telephone.

If the former arrangement having a recording/playback function for every extension is adopted, it raises the cost of the telephone exchange system. In order to convey the contents of a recording as is from one extension telephone to another, a troublesome operation is required in which the recording medium such as a recording tape is handed over to the party for which the message is intended or the recording is re-recorded on the recording medium possessed by this party.

In the latter case where the storage area of one memory device is apportioned to each of a plurality of extension telephones and used to record and/or playback a telephonic communication, the storage areas used are fixedly assigned to the telephones. Consequently, the storage capacity for a particular user may be inadequate or, even if the storage capacity for a user is more than enough, it cannot be used by another telephone. Thus, the storage areas cannot be effectively exploited by the system as a whole.

Further, in conventional telephone exchange systems, when a message is requested to be delivered to someone who is absent, and the party who is to receive the message happens to return to the location of his or her own telephone while the recording is in progress, this individual may not know that the message intended for him or her is being recorded and will not be able to engage the calling party who is in the process of leaving the message.

In addition, since the starting time of a recording cannot be determined in conventional telephone exchange systems, one may not respond soon enough to a recorded message, to the detriment of a commercial transaction or the like.

SUMMARY OF THE INVENTION

Accordingly, an object of the present invention is to provide an inexpensively constructed telephone exchange system in which efficient use is made of a recording/playback memory shared by each extension telephone accommodated by the exchange system, thereby raising degree of freedom in terms of recording/playback and improving service.

Another object of the present invention is to provide a telephone exchange system in which a party to receive a message is capable of knowing that the message is in the process of being recorded, thereby making it possible for this party to respond to the party leaving the message.

According to the present invention, the foregoing objects are attained by providing a telephone exchange system comprising recording control means for controlling the starting and stopping of recording of a voice on recording means, managing means for managing the recording operation of the recording means, specific-information storing means for storing, based upon results of management performed by the managing means, at least recording area information, telephone-specifying information, recording starting-position information and recording end-position information as information specifying a recording, altering means for altering information, which has been stored in the specific-information storing means, in accordance with a change in the information specifying recording based upon the management performed by the managing means, erasing means for erasing a recording on the recording means after the recording is transferred in response to a transfer request, voice detecting means for detecting whether a voice is present during a telephone call, means for starting or stopping recording of the voice by the recording means based upon results of detection performed by the voice detecting means, recording sensing means for sensing whether there is a recording for a specific telephone based upon results of management performed by the managing means, display means for displaying, on the specific telephone, and based upon the results of sensing performed by the recording sensing means, a message to the effect that there is a recording for this specific telephone, acknowledging means for acknowledging a connect request from the specific telephone while the recording means is recording a voice, and connection control means for connecting the telephone which has issued the connect request and the calling party when the acknowledging means acknowledges the connect request.

Still another object of the present invention is to provide a telephone exchange system in which, when a recording is played back, the time at which the recording was made is announced by voice, thereby enhancing the reliability of recorded information.

According to the present invention, the foregoing object is attained by providing a telephone exchange system comprising recording control means for controlling the starting and stopping of recording of a voice on recording means, managing means for managing the recording operation of the recording means, recording specifying means for specifying a recording in the recording means based upon results of management performed by the managing means, telephone specifying means for specifying a telephone among a plurality of telephones based upon results of management performed by the managing means, playback control means for playing back the recording, which has been specified by the recording specifying means, by the telephone specified by the telephone specifying means, timekeeping means for clocking time, and converting means for converting time clocked by the timekeeping means into an audible voice.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A–3B is a diagram showing a management index table of a voice memory;

FIGS. 4A–4B is a flowchart illustrating a processing procedure for recording of a voice message during a telephone call according to the first embodiment;

FIGS. 7A–7B is a flowchart illustrating a processing procedure for erasing a recorded voice message according to the first embodiment;

FIG. 13 is a block diagram illustrating the overall construction of a fourth embodiment of a telephone exchange system according to the present invention;

FIG. 14 is a diagram showing the construction of a time-stamp ROM;

FIG. 16 is a diagram showing the construction of a voice memory according to the fourth embodiment;

FIG. 17 is a flowchart illustrating an operation for playing back a recording according to the fourth embodiment; and FIGS. 18A–18B is a flowchart illustrating a modification of the operation for playing back a recording according to the fourth embodiment.

DESCRIPTION OF THE PREFERRED EMBODIMENTS

[First Embodiment]

Figure 1:
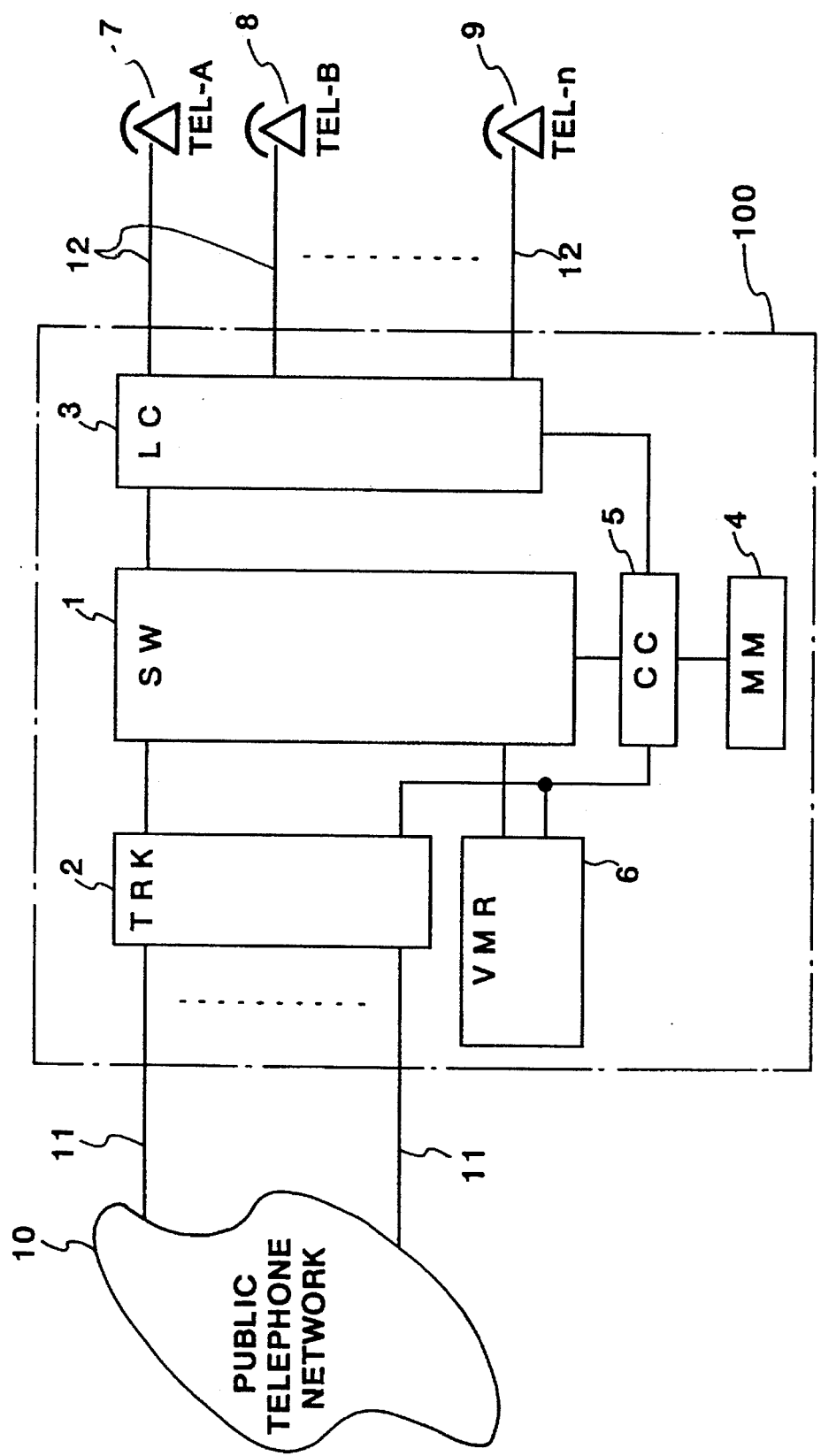
FIG. 1 is a block diagram illustrating the overall construction of a first embodiment of a telephone exchange system according to the present invention.

FIG. 1 is a block diagram showing the overall construction of a telephone exchange system according to a first embodiment of the present invention.

The telephone exchange system, indicated at numeral 100, includes a switch circuit network (SW) 1 for performing time-division switching, a trunk circuit unit (TRK) 2 which interfaces a plurality of line wires 11 accommodated in the system 100 and connected to a public telephone network 10, a line circuit (LC) 3 having an interface for extensions 12, a memory (MM) 4 for storing a control program and data, a central controller (CC) 5 for controlling the overall system, and a voice message controller (VMR) 6 which, in response to instructions from the CC 5, applies predetermined processing, described later, to voice information handled by the telephone exchange system. Extension telephones 7 through 9 are connected to the LC 3 via the extensions 12.

Figure 2A:
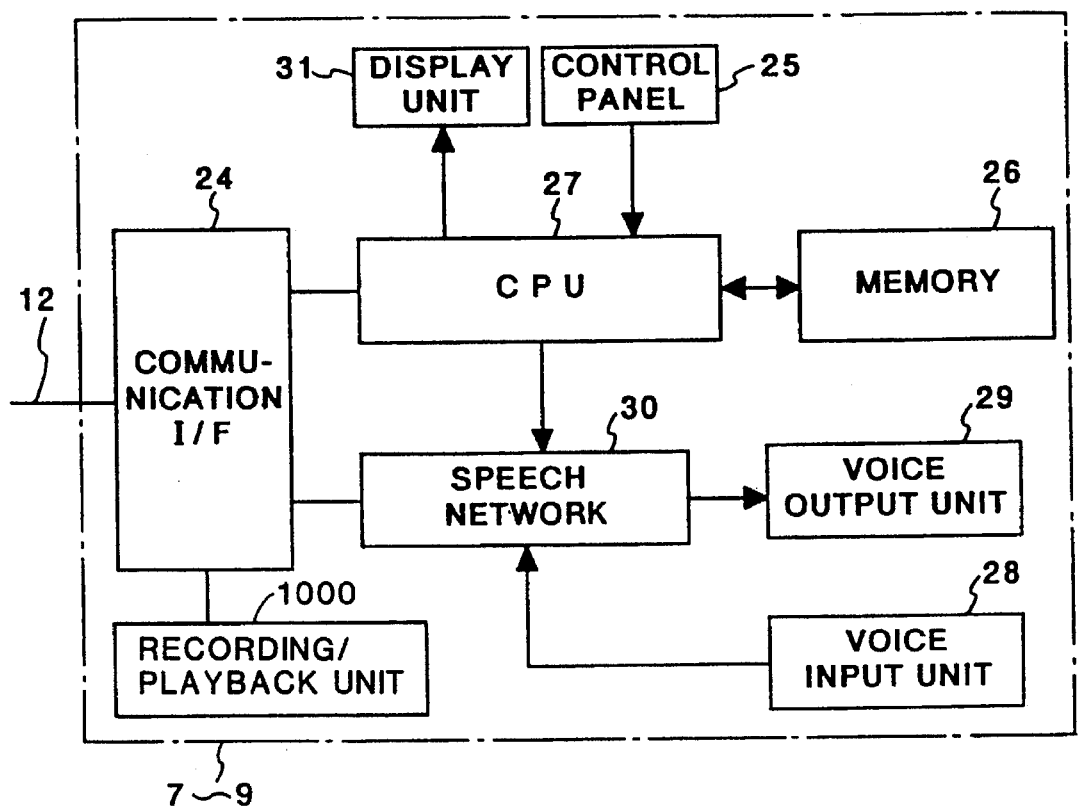
FIG. 2A is a block diagram illustrating the construction of an extension telephone connected to the telephone exchange system.

FIG. 2A is a block diagram showing the construction of the extension telephones, which are private telephones connected to the telephone exchange system 100. Each of the extension telephones 7 through 9 includes a communication interface 24 for connecting channels to the telephone exchange system 100 and communicating control data between the telephones and the exchange system, a display unit 31 for displaying dialed numbers, messages and the like, a CPU 27 comprising a microprocessor which controls the overall operation of the extension telephones 7 through 9, a control panel 25 comprising dial buttons or the like, a memory 26 which stores a program that decides the operation of the CPU 27 as well as control information such as information necessary for operation of the extension telephones 7 through 9, a voice input unit 28 comprising a microphone or transmitter, and a voice output unit 29 comprising a speaker or receiver.

Figure 2B:
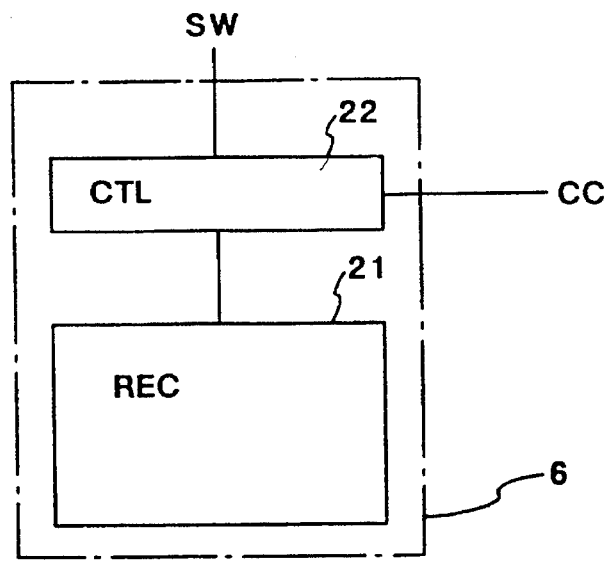
FIG. 2B is a block diagram showing the internal construction of a voice-message controller.

FIG. 2B is a block diagram illustrating the internal construction of the voice message controller 6 constituting part of the telephone exchange system 100.

The voice message controller 6 is provided with a voice memory (REC) 21 constituted by a semiconductor memory for storing a recorded voice, and a voice controller (CTL) 22 which controls the recording and playback operations of the voice memory.

More specifically, when recording is performed, the voice controller 22 starts recording a voice, which is received from the switch circuit network 1, from a recording starting position in the voice memory 21 designated by the central controller 5, and continues the recording operation until the end is designated by the central controller 5. After the recording operation is ended by the end designation, the central controller 5 is informed of the recording end position in the voice memory 21.

When playback is performed, the voice controller 22 plays back the voice data from the starting position to the end position of the voice memory 21 designated by the central controller 5. The voice controller 22 outputs the played back voice data to the switch circuit network 1 and, at the conclusion of playback, so informs the central controller 5.

Figure 2C:
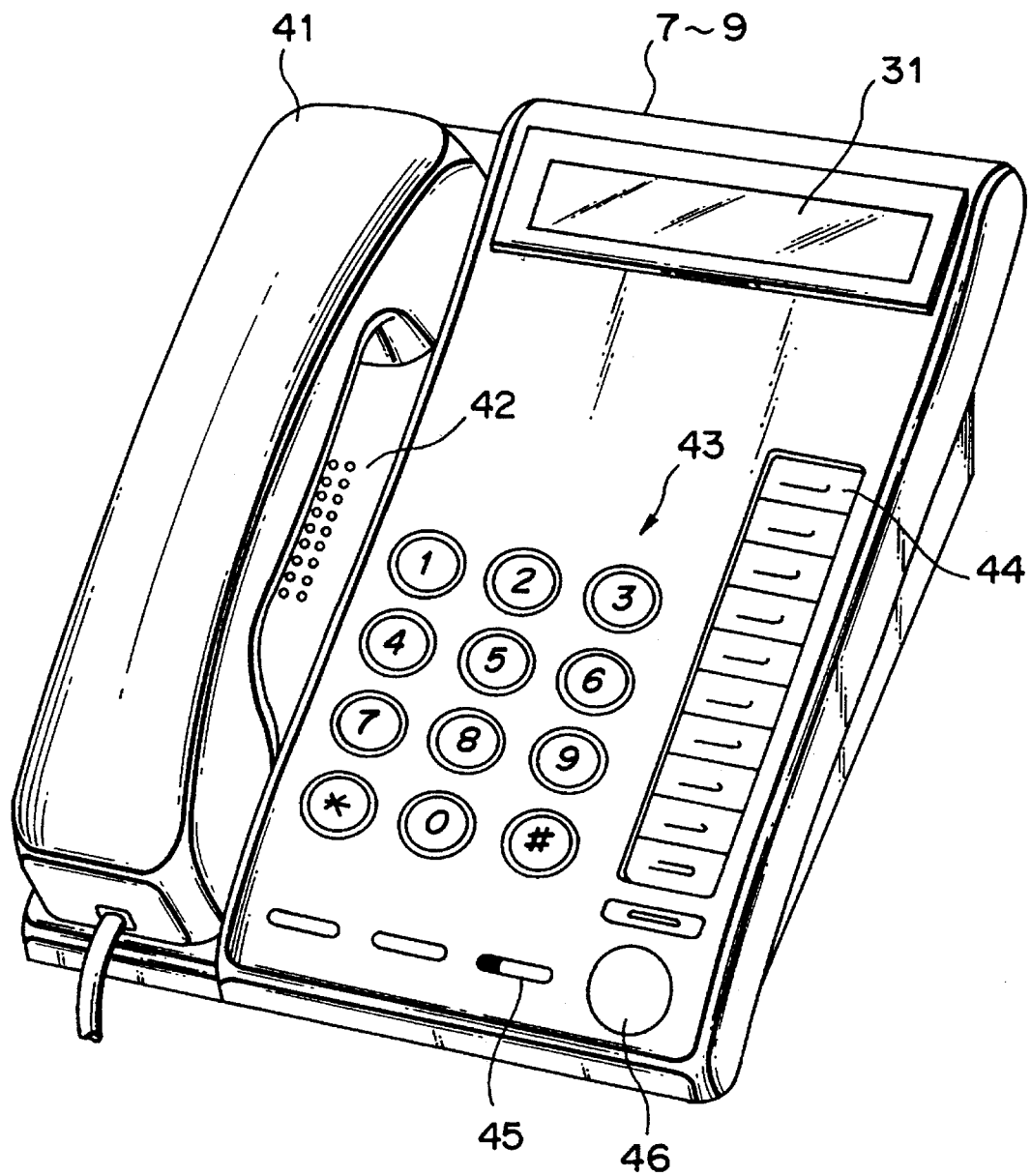
FIG. 2C is an external view of the extension telephone connected to the telephone exchange system.

FIG. 2C is an external view of the extension telephones 7 through 9 connected to the telephone exchange system of this embodiment. As shown in FIG. 2C, each of the extension telephones 7 through 9 includes a ten-key pad 43 serving as a control panel, a line-wire selecting key 44, a recording key 45, a hold key 46, and a speaker 42 serving as a voice output unit. A handset 41 functions as both a voice output unit and a voice input unit.

FIG. 3 is a diagram showing a management index table of the voice memory 21.

In the illustrated embodiment, the voice memory 21 is managed by being divided into storage areas (hereinafter referred to as "blocks") of four-second units serving as recording time. The management index table comprises a table A (TBL-A) shown in FIG. 3a and a table B (TBL-B) shown in FIG. 3B.

The table A has records R0 through Rn. The record R0 comprises a counter (CNT1) the value of which represents the block number of the next recording starting position, and a counter (CNT2) the value of which represents the number of blocks capable of being recorded on consecutively from the recording starting position. The records R1 through Rn are constituted by an extension number (D1) serving as information indicating the possessor of a recorded voice message, a message number (D2) for specifying individual voice messages for the same possessor, a block number (D3) which indicates the recording starting position of the voice message within the voice memory 21, and a block number D4 which indicates the recording end position of the voice message within the voice memory 21.

The table B indicates the status of use of every block. If the status of a block is that the block is unused, this is indicated by a "0"; if the status of a block is that the block is being used, this is indicated by a "1".

Figure 3A:
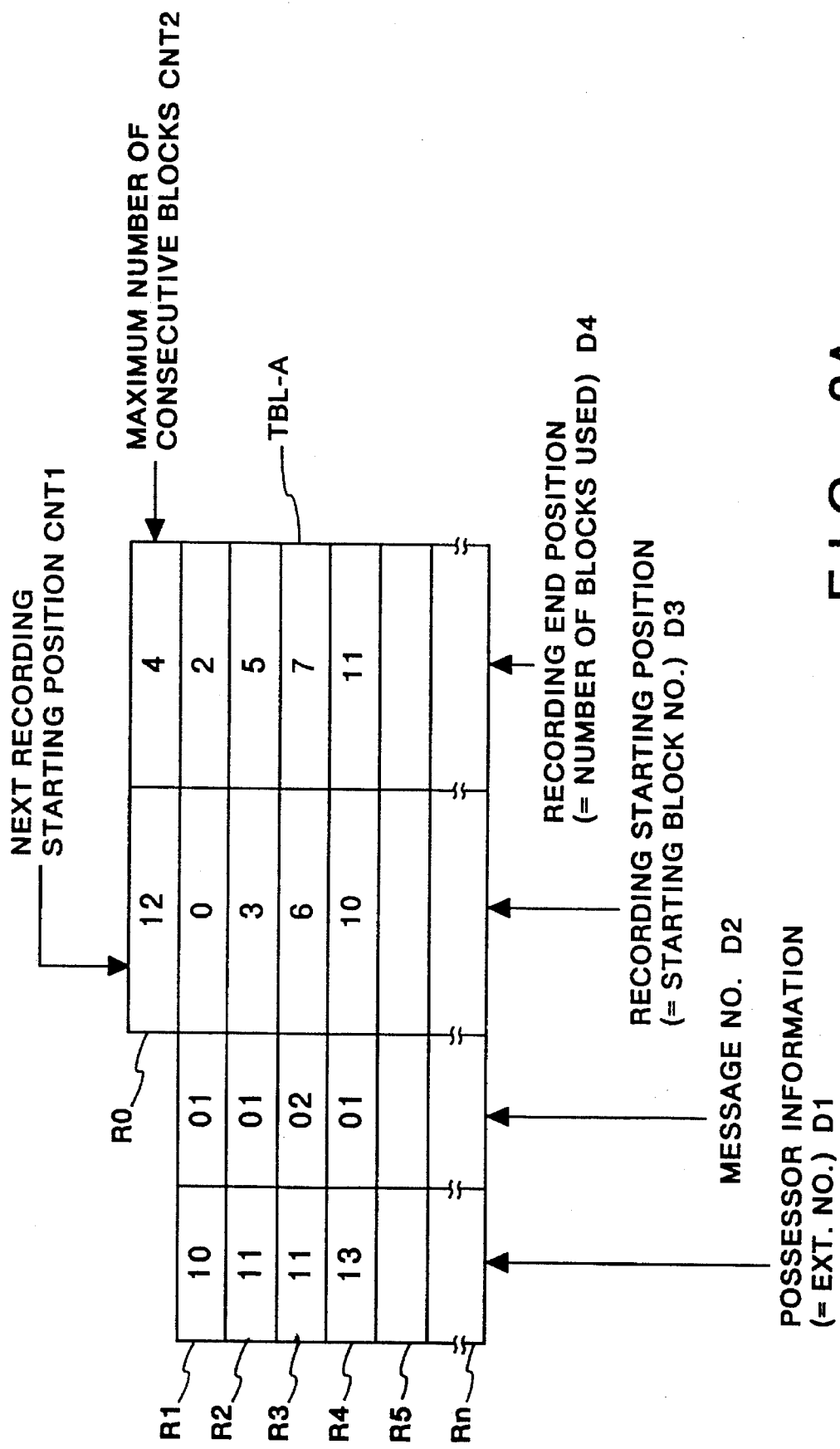

In FIG. 3B, blocks 0–2 indicate that the possessor of extension number "10" has been recorded as message number 01; blocks 3–5 indicate that the possessor of extension number "11" has been recorded as message number 01 and blocks 6–7 indicate that the same possessor has been recorded as message number 02 has been recorded; and blocks 10–11 indicate that the possessor of extension number "13" has been recorded as message number 01. The remaining blocks 8, 9, 12–15 are unused. When there is a recording request, recording starts from block 12, and a maximum of four blocks, namely 16 seconds of conversation, can be recorded, as record R0 indicates in FIG. 3A.

The processing procedure for a voice message in accordance with this embodiment will now be described.

Figure 4A:
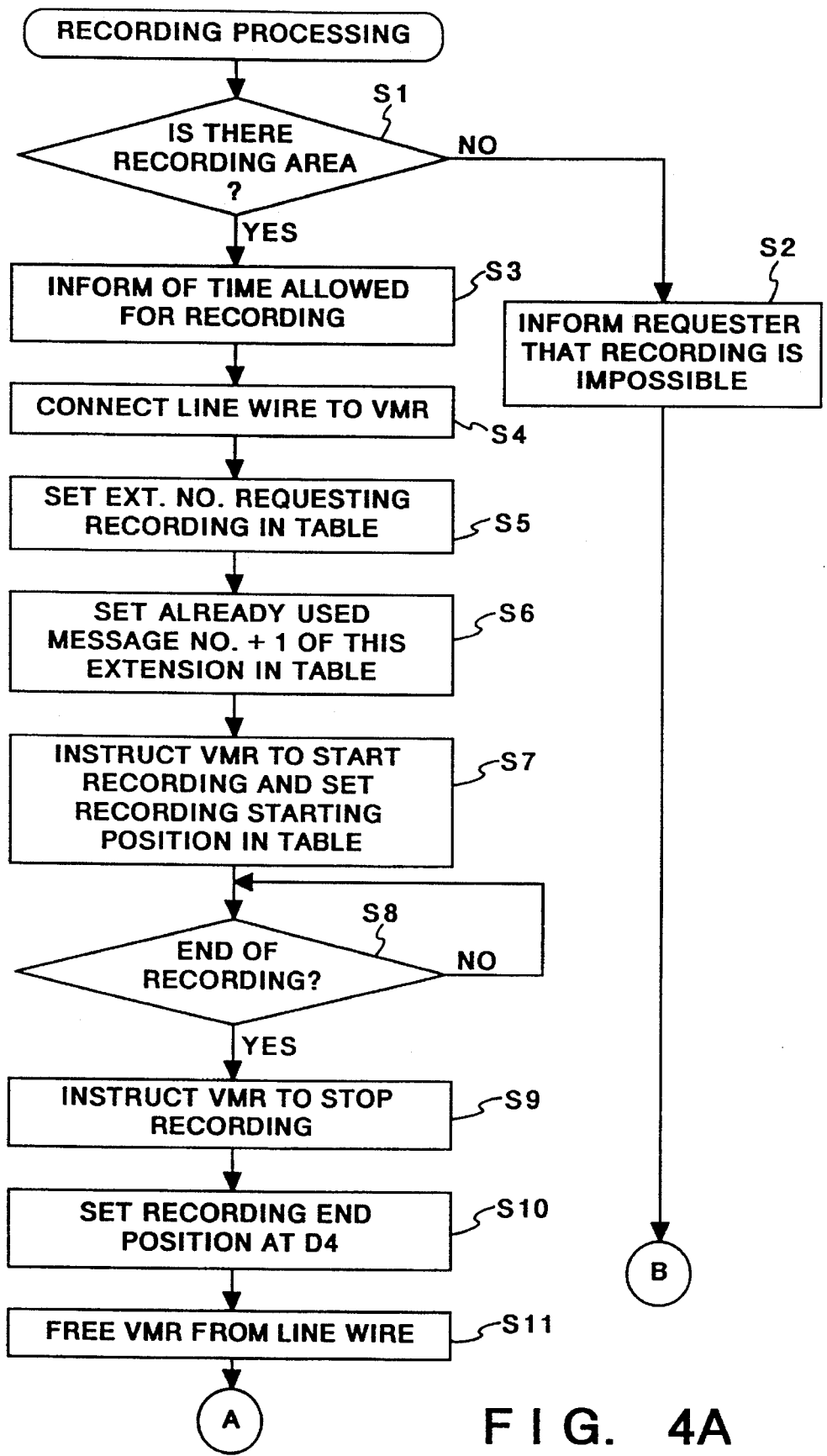

FIG. 4 is a flowchart illustrating a processing procedure for recording a voice message while a call is in progress.

Assume that a special number (e.g., 80) which requests the start of recording has been dialed in from the extension telephone 7 (TEL-A) while this telephone is engaged in a call via a line wire. This request is sent to the central controller 5 via the line circuit 3.

At step S1 of the flowchart, the central controller 5 checks to determine whether an area capable of being recorded in is available in the voice memory 21 (i.e., whether CNT2=0 holds). If there are no blank areas, the extension telephone which has made the recording request is informed, as by an audible tone or visible display, of the fact that recording is impossible (step S2).

If recording is possible, the extension telephone is informed, from the value of CNT2, of the amount of time available for recording (step S3). The central controller 5 connects the line wire involved in the call and the voice message controller 6 via the switch circuit network 1 (step S4).

Next, the central controller 5 searches for a blank record in the table A. In the example illustrated in FIG. 3A, the extension number (assumed to be "10") of the extension telephone which has made the recording request is stored at D1 of record R5 (step S5). Next, "10" is searched from D1 of each record in table A, the maximum value among the already used message numbers is retrieved, one is added to this value and the sum is set at D2 of record R5. In this example, "2" is set (step S6).

The central controller 5 then instructs the voice message controller 6 to start recording from the position indicated at CNT1, and sets this recording starting position at D3 of record R5 in table A (step S7). In this example, "12" is set.

The system then waits for a recording-end request from the extension telephone (step S8). This request is made using a special number (e.g., 81) entered from the extension telephone, in the same manner as the request for starting recording. If the central controller 5 has received the recording-end request transmitted via the line circuit 3, then it instructs the voice message controller 6 to terminate the recording (step S9).

Upon receiving the recording end position from the voice message controller 6, the central controller 5 sets this position at D4 of record R5 (step S10) and opens the connection between the voice message controller 6 and the line wire 11 (step S11).

The record R5 is completed by the foregoing processing. It should be noted that the extension telephone which has made the recording request (its extension number is "10" in this case) is the possessor of the recorded message, however, the possesor can be designated when the recording ends. For example, this can be done if the pertinent extension number is dialed in following the special number "81" mentioned above.

If possessor information is designated (step S12), D1 of record R5 is changed by the central controller 5 to what has been designated (step S13).

Next, the table B is updated. It should be noted that X in the flowchart indicates a working counter.

First, the block number of the currently prevailing recording starting position is set in the counter X (step S14), and the value of the position in table B indicated by the counter X is made "1", which indicates that recording has been completed (step S15). Next, one is added to counter X (step S16), and the value in counter X is compared with the value of D4 (step S17). Steps S14 and S15 are repeated until it is determined that the position is the recording end position. When the updating of table B ends, processing for updating CNT1 and CNT2 is carried out. This processing will be described later.

In order to maintain confidentiality, it is assumed here that in principle the voice message can only be played back by the extension telephone indicated at D1 of each record in table A. In order for a playback request to be made by the extension telephone, it will suffice to dial in a special number indicative of a playback request as well as the message number after the telephone is taken off the hook.

It should be noted that the central controller 5 instructs the extension telephone where the voice message is to be played back, to display the fact that there is the message stored to the telephone and the message number associated with it.

Figure 5:
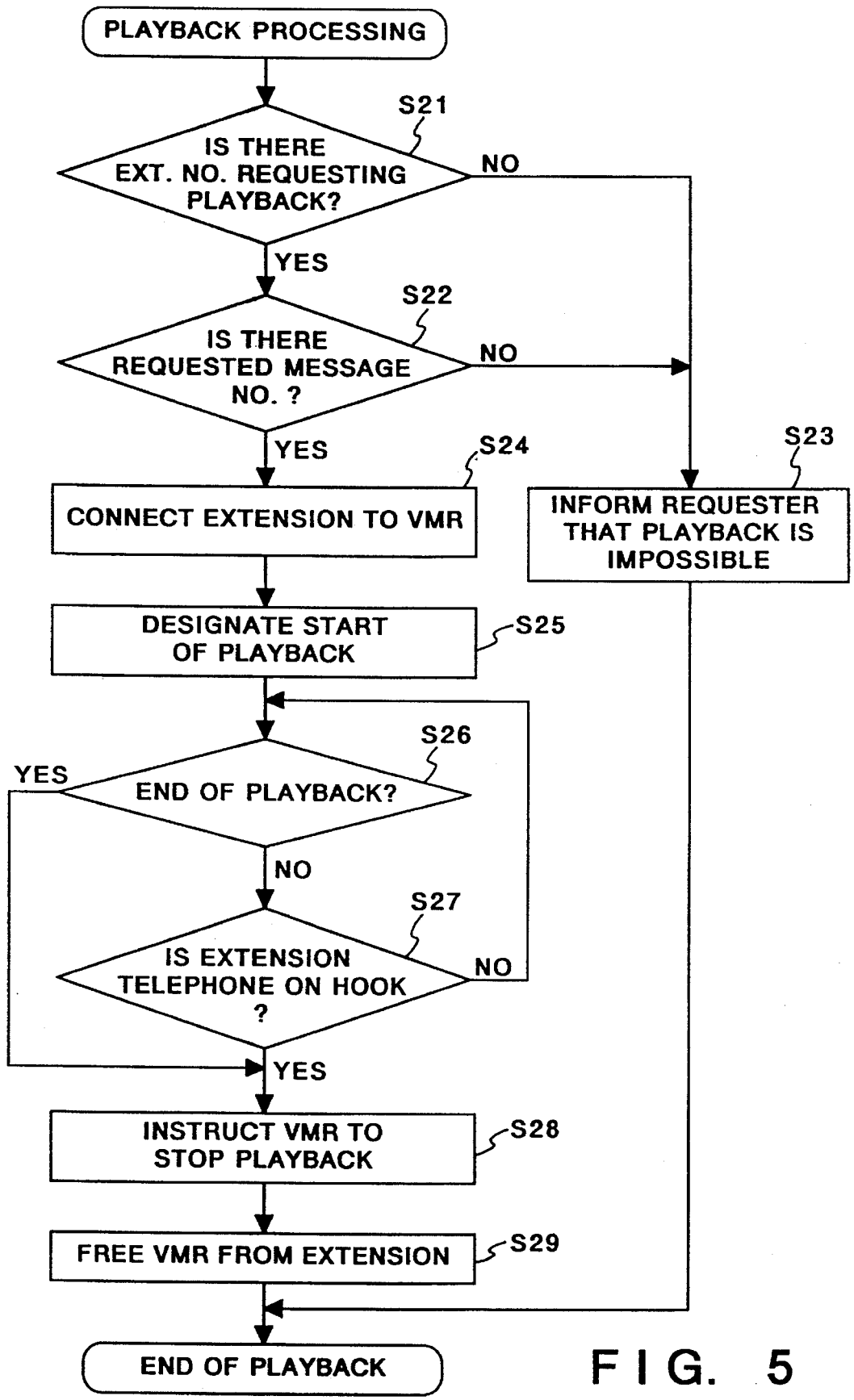
FIG. 5 is a flowchart illustrating a processing procedure for playing back a voice message according to the first embodiment.

FIG. 5 is a flowchart for describing processing in a case where a playback request is received.

The central controller 5 determines whether a voice message possessed by the extension telephone which has issued the playback request is present in the table A (step S21) and checks to see whether the requested message number is present (S22) in table A. If these are not present in table A, then the program proceeds to step S23, where the central controller 5 informs the requesting extension telephone, by means of an audible tone or visual display, of the fact that playback is impossible. Processing is then terminated.

If a requested voice message does exist, however, the voice message controller 6 is connected, via the switch circuit network 1, to the extension which has issued the request (step S24). The central controller 5 then obtains the playback starting and end positions from D3 and D4 of the record in table A that match the playback request, and the voice message controller 6 is instructed to perform playback based upon these positions (step S25). Next, while the system waits for the end of playback from the voice message controller 6, monitoring is performed to determine if the extension telephone which has made the playback request has been hung up (steps S26, S27). If the latter is detected, the voice message controller 6 is instructed to terminate playback (step S28), and the connection between the voice message controller 6 and the requesting extension is opened (step S29).

Thus, a voice of a telephonic communication in progress can be recorded and played back from any extension telephone.

Figure 6:
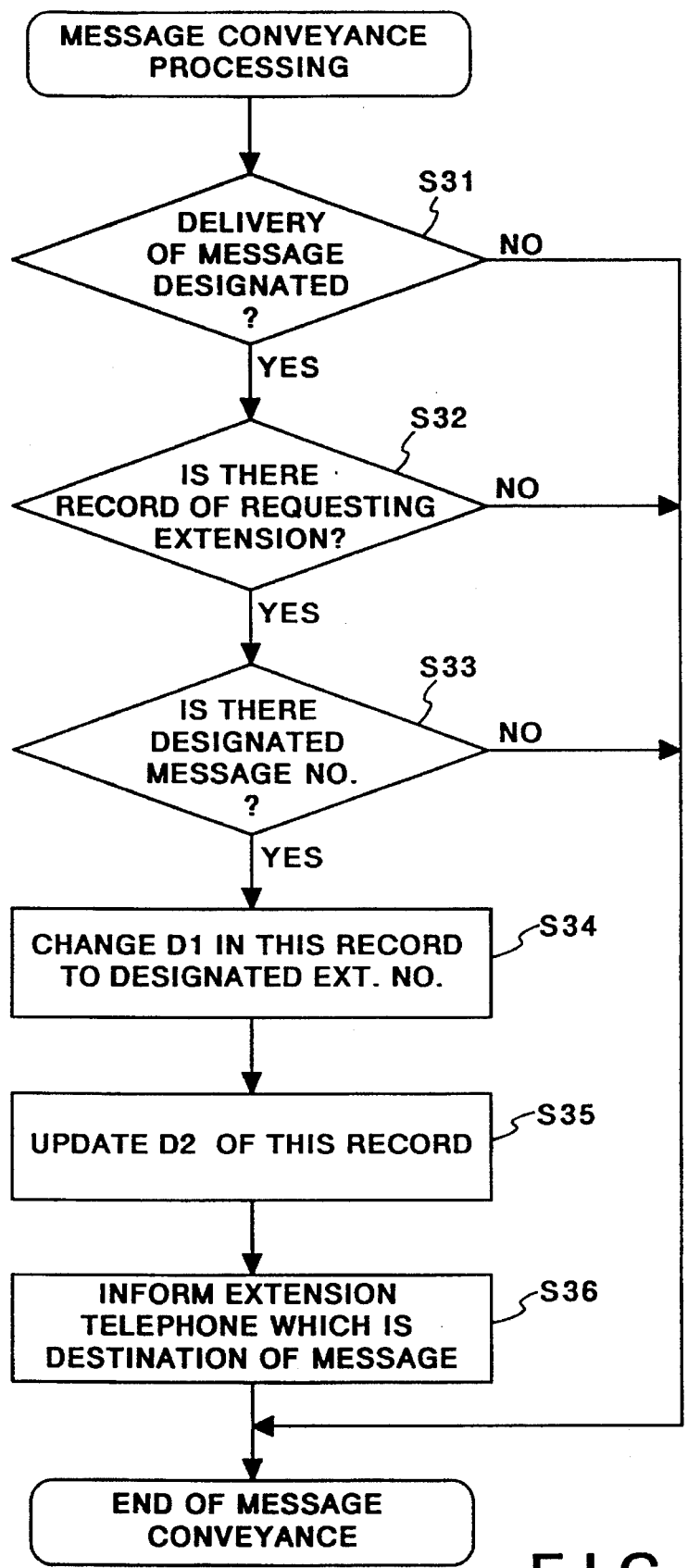
FIG. 6 is a flowchart illustrating a processing procedure for conveying a voice message according to the first embodiment.

Next, a case will be described in which a voice message already recorded by applying steps S12, S13 (FIG. 4B) at the time of recording is played back by another extension telephone. For example, in a case where a message intended for the possessor of extension telephone (extension number assumed to be "12") is recorded by the foregoing method at extension telephone (extension number assumed to be "11") and the possessor of the pertinent recorded voice message is extension telephone "11", the message can be conveyed by the method shown in FIG. 6.

First, after the extension telephone "11" is taken off the hook, a special number requesting conveyance of the message, the message number and the extension number "12" which is the destination of the message are dialed in. When there is such a request for conveyance of a message (YES at step S31), it is verified at step S32 whether the record corresponding to the extension telephone "11", which is the extension telephone making the request, is present in table A, and then it is verified at step S33 whether the designated message number is present in table A. If the answer is YES at steps S32 and S33, then D1 of the pertinent record is changed to the designated extension number "12" (step S34), and the message number also is updated in dependence upon the changed extension number (step S35). Upon completion of such updating, the extension telephone that has newly become the possessor of the voice message is informed, by an audible tone or visible display, of the fact that there is a message to be conveyed (step S36). Processing for conveyance of the message is then terminated.

On the other hand, if the possessor of the extension telephone "12" informed of the fact that there is a message performs the above-described playback operation, this telephone can play back the voice message intended for it.

In the foregoing processing, rather than entering a specific extension number as the destination of a message, e.g., "00" can be entered to designate all extensions, or "01"–"09" can be entered to designate separately determined groups of extensions, in which case the designated extensions would become the destination of the message to be conveyed. With such an arrangement, the extension telephone "11" could receive a message from a superior outside the office, and this message could then be delivered to all of the extensions. The same is true for the operation at step 13 (FIG. 4B)

Figure 7B:
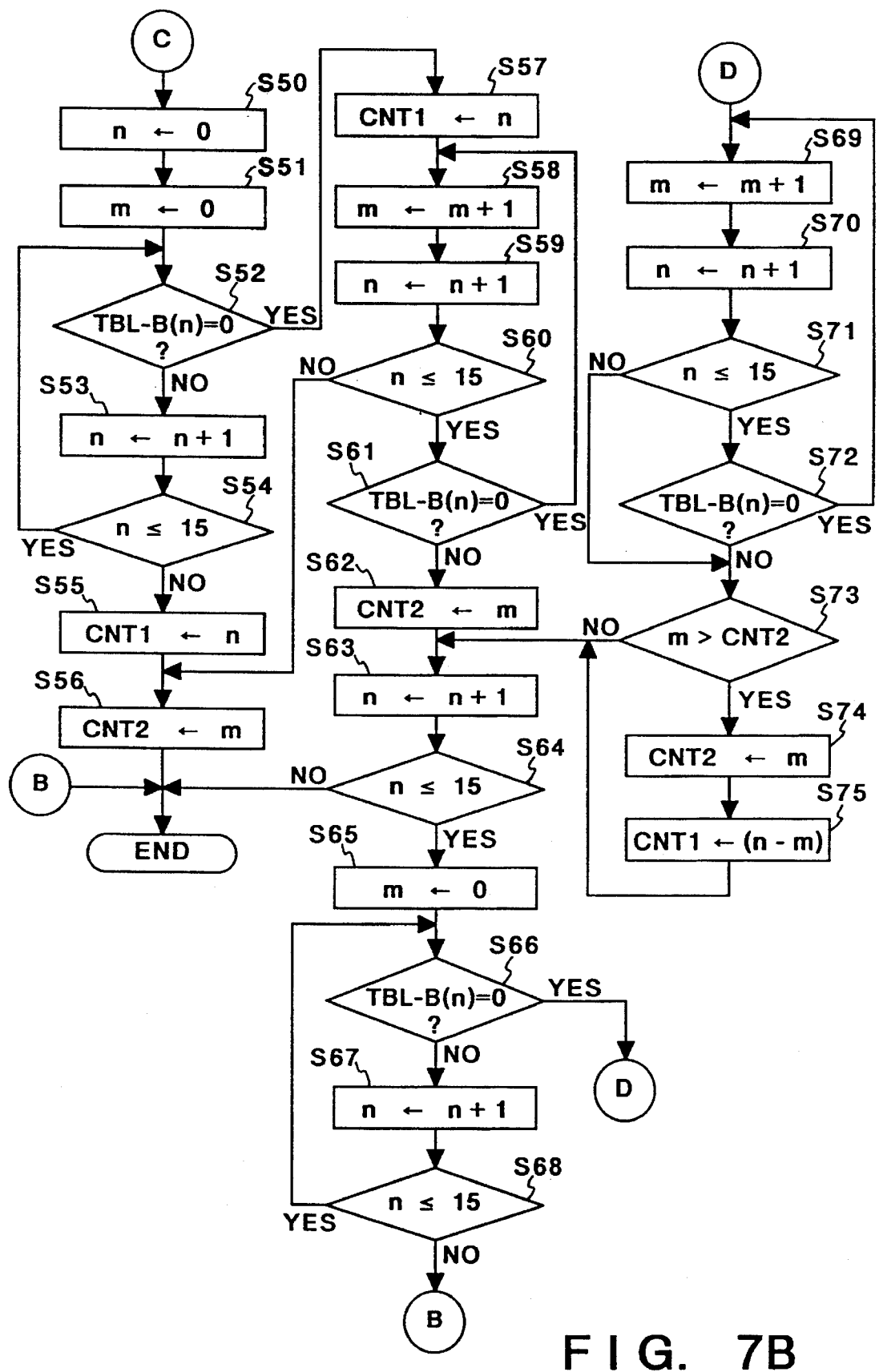

FIG. 7 is a flowchart illustrating processing for erasing an already recorded voice message.

Erasing of a voice message is carried out based upon dialing in, from an extension telephone, a special number requesting erasure and a message number.

First, the central controller 5 verifies whether a record matching the requesting extension number and the designated message number is present in table A (steps S41, S42). If the record is not present, this processing is terminated. If the abovementioned numbers are present, however, D1, D2 of the pertinent record are cleared (step S43) and table B is updated by making "0" the status of use of this block in table B, which is indicated by D3 of the pertinent record (step S44). ("0" means that the block is not being used.) The value of D3 is then incremented (step S45), and the processing which makes the pertinent blocks of table B "0" is continued until the value of D3 exceeds a value corresponding to the position indicated by D4 of the pertinent record (step S46).

When all of the pertinent blocks of table B have been made "0", D3 and D4 are cleared (step S47) and a transition is made to processing for updating CNT1 and CNT2. In the description that follows, n represents a working counter which corresponds to block position in the table B, m represents a working counter which represents the number of blocks in a non-utilized state.

First, the counters n, m are initialized to "0" (steps S50, S51) and a search is performed successively from 0 in order to detect blocks not being used (steps S52, S53, S54). If there are no unused blocks over the total number of blocks, the values of counters n, m are set in CNT1, CNT2, respectively (steps S55, S56). This indicates that CNT1, CNT2 are both "0", meaning that the entirety of the voice memory 21 has been used up.

If an unused block has been found in table B at step S52, then the value of n prevailing at this time is set in CNT1 (step S57). Counter m is then incremented (step S58) and the number of consecutive unused blocks is counted (steps S58, S59, S60, S61).

When it is determined at step S60 that the value of n has exceeded 15, indicating that the end of table B has been reached, or when it is determined at step S61 that there are no unused blocks, the value in counter m is set in CNT2 (step S56 or S62). After the processing of step S62, the counter n is incremented (step S63). If the search has reached the end of table B, i.e., if the decision rendered at step S64 is NO, then processing is terminated.

On the other hand, if it is decided at step S64 that the search has not reached the end of table B, then the program proceeds to step S65, where counter m is initialized to "0", and unused blocks are retrieved (steps S66, S67, S68) just as in steps S52 through S54 above.

If an unused block is found at step S66, the number of consecutive unused blocks is counted (steps S69, S70, S71) just as in steps S58 through S61 above.

If it is decided at step S71 that the end of table B has been reached, or if an unused block is found at step S72, then the program proceeds to step S73, where the number m of blocks just counted and the block count CNT2 counted last are compared. If m is greater, the program proceeds to step S74, where the value of m is set in CNT2. Next, a value obtained by subtracting m from the present block position n is set in CNT1 (step S75) as the recording starting position which corresponds to CNT2. The program then proceeds to step S63 and processing is repeated up to the end of the table B.

By virtue of the foregoing processing, the maximum number of consecutive blocks in an unused state in voice memory 21 can be set in CNT2 and the number of the recording starting block can be set in CNT1 at the same time.

In accordance with the first embodiment, as described above, a memory which stores voice messages and an index for managing individual voice messages in the entire memory are provided, the memory is shared mutually by the extension telephones connected to the system, and the memory is managed upon being divided into units of minimum capacity sufficient for ordinary recording purposes. The following advantages are obtained:

(1) It is unnecessary to make a copy of a voice message, which has been recorded in the memory, for the purpose of delivering the message to another party, and no increase in the capacity of the memory is required. This means that there is no increase in the cost of the system.

(2) A change in the possessor information in the index is performed in exact fashion, and processing for conveying a message to a third party can be performed simply while maintaining confidentiality.

(3) Recording always can be performed for the maximum recordable period of time in dependence upon the status of use of the memory when a telephone conversation is recorded, and the memory can be exploited efficiently.

(4) Even if recording and playback are repeated, only enough memory capacity needed for recording is set aside, and the memory can be used effectively without leaving areas in the memory that are incapable of being used.

Furthermore, in the present embodiment, requests for starting and ending recording and playback, a request for erasure, etc., are capable of being made by dialing in special numbers from an extension telephone. However, an arrangement can be adopted in which the extension telephone is provided with function buttons corresponding to these various requests.

In addition, if the number of voice messages that can be recorded per extension telephone is limited to one, the message numbers used in the embodiment can be omitted.

Further, the possessor information is not limited to extension numbers. For example, use can be made of other information specifying a particular individual, such as the physical location at which the telephone has been installed, an employee number at the time or recording, etc. Moreover, by additionally designating a password at the time of recording and requesting input of the password at the time of playback, confidentiality can be better protected. All of these options can be realized with facility by expanding the possessor information in table A.

If the capacity of the voice memory 21 and the units of the blocks are of the minimum necessary capacity needed to record a single telephonic communication, these values may be set as desired, and the size of the table B can be changed accordingly. The voice memory 21 can be a magnetic tape instead of a semiconductor memory, and it will suffice if the information recorded on these media is information indicative of starting- and end-positions in table A.

Furthermore, though the present embodiment deals with voice messages from outside line wires, an arrangement can be adopted in which voice messages between extensions are also recorded.

<Modification>

Figure 8:
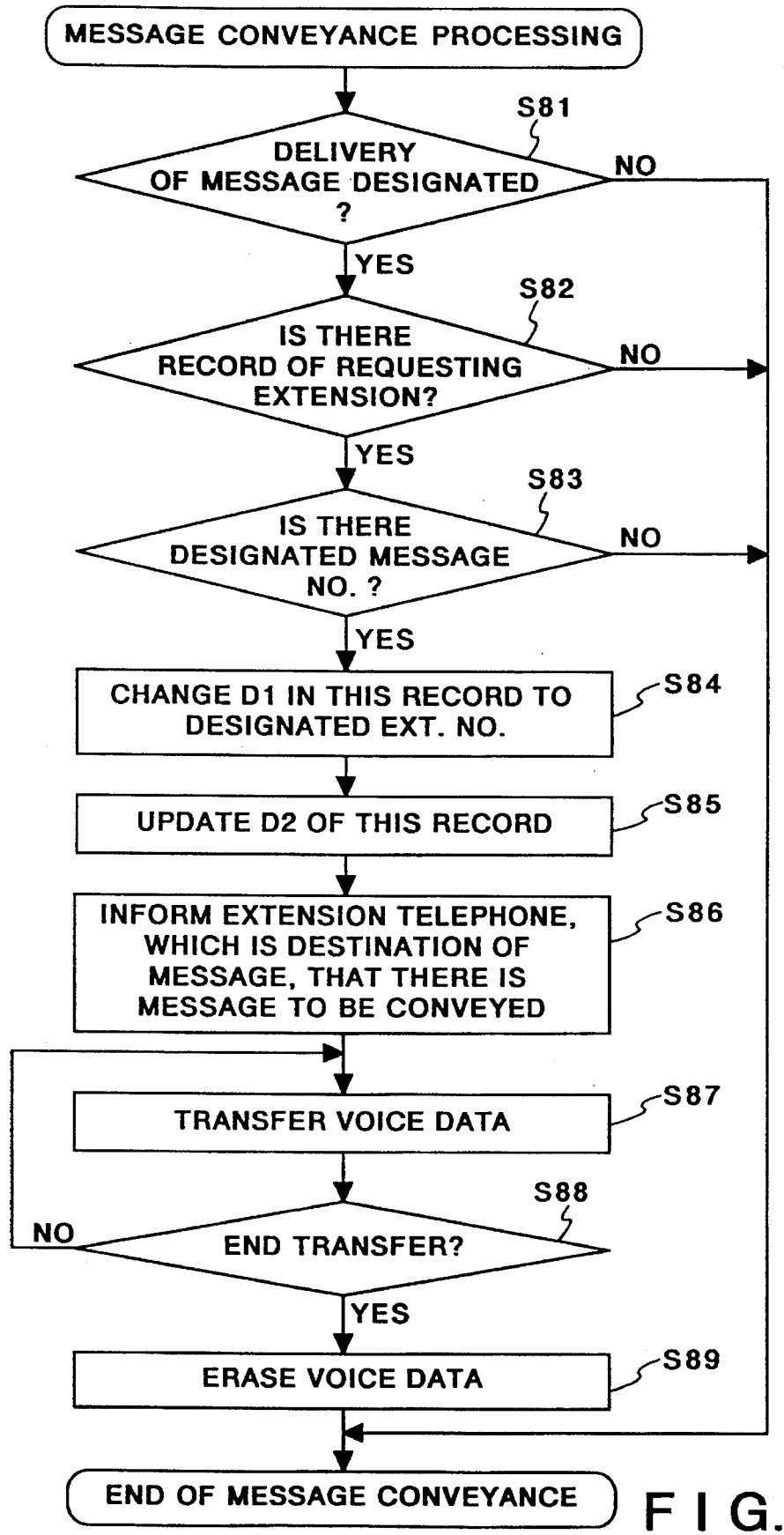
FIG. 8 is a flowchart illustrating modification of a processing procedure for conveying a voice message according to the first embodiment.

In the first embodiment described above, processing for delivering a message is such that the possessor of extension telephone "11" performs a prescribed operation to inform the extension telephone "12" of the fact that there is a message to be delivered. A modification of this embodiment will now be described with reference to the flowchart of FIG. 8.

After the extension telephone "11" is taken off the hook, a special number requesting conveyance of the message, the message number and the extension number which is the destination of the message are dialed in from extension telephone "11". When there is such a request for conveyance of a message (YES at step S81), the central controller 5 verifies at step S82 whether the record corresponding to the extension telephone "11", which is the extension telephone making the request, is present in table A, and then verifies at step S83 whether the designated message number is present in table A. If the answer is YES at steps S82 and S83, then D1 of the pertinent record is changed to the designated extension number (step S84), and the message number also is updated in dependence upon the changed extension number (step S85). Upon completion of such updating, the extension telephone that has newly become the possessor of the voice message is informed, by an audible tone or visible display, of the fact that there is a message to be conveyed (step S86).

At the same time, the central controller 5 starts, via the line circuit 3, a recording/playback unit 1000 shown in FIG. 2A belonging to the extension telephone "12", and transfers the voice data, that has been stored in the voice memory 21, to this recording/playback unit (step S87). Next, at step S88, it is determined whether the transfer has ended. If the answer is YES, then the voice data in the voice memory 21 is erased at the ensuing step S89. It should be noted that this erasing processing is the same as that illustrated in FIG. 7 and therefore need not be described again.

The possessor of extension telephone "12", which has received the transfer of voice data, is capable of determining, by the aforementioned audible tone or visible display, that there is a message to be delivered to this telephone. By performing a prescribed operation, the possessor of this telephone is capable of hearing the contents of the message.

Thus, this modification is such that in a telephone exchange system having a function for recording a telephonic communication for the purpose of allowing it to be heard by a third party, it is no longer necessary to hold all recordings in a memory within the system. This makes it possible to reduce the necessary memory capacity that is provided within the system for the purpose of voice recording/playback, and to effectively utilize any extra memory area for other applications.

[Second Embodiment]

A second embodiment of the present invention will now be described. It should be noted that the construction of the telephone exchange system according to this embodiment is the same as that of the first embodiment and therefore need not be described again.

Figure 9:
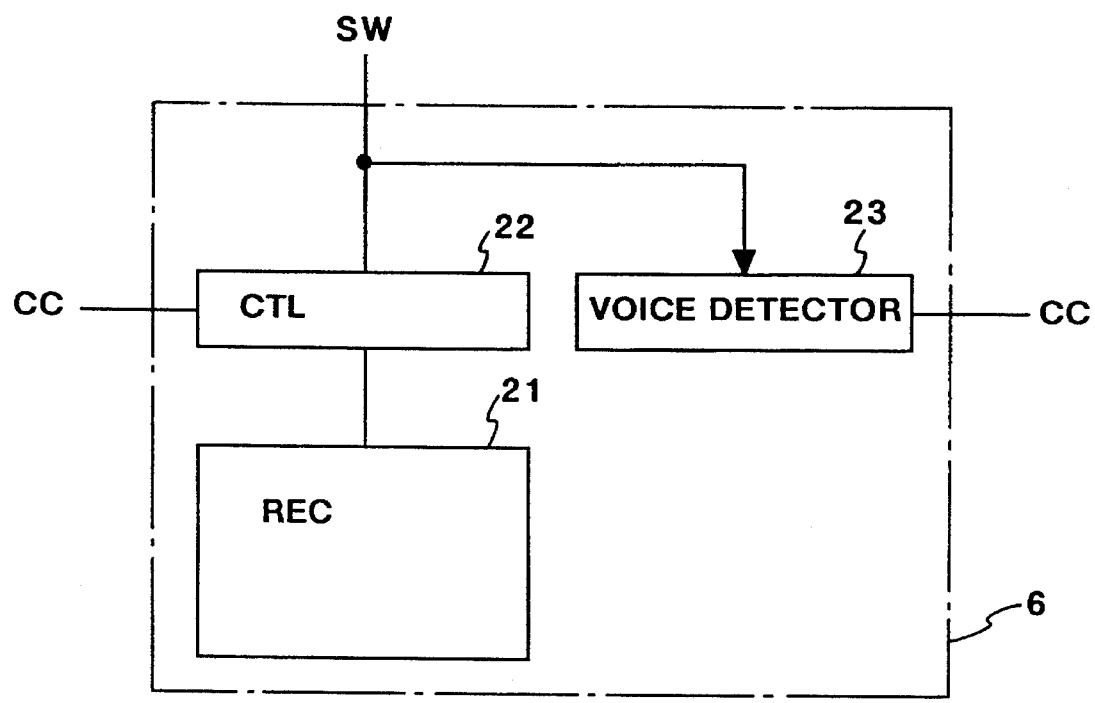
FIG. 9 is a block diagram illustrating the internal construction of a voice-message controller according to a second embodiment of the present invention.

FIG. 9 is a block diagram illustrating the internal construction of the voice message controller constituting the telephone exchange system of the second embodiment. As shown in FIG. 9, a voice detector 23 is for detecting the absence or presence of a voice during a telephonic communication. The voice detector 23 determines that there is a voice present only when a voice above a predetermined level continues in excess of a predetermined period of time. The result of this determination is delivered to the central controller 5.

Figure 10A:
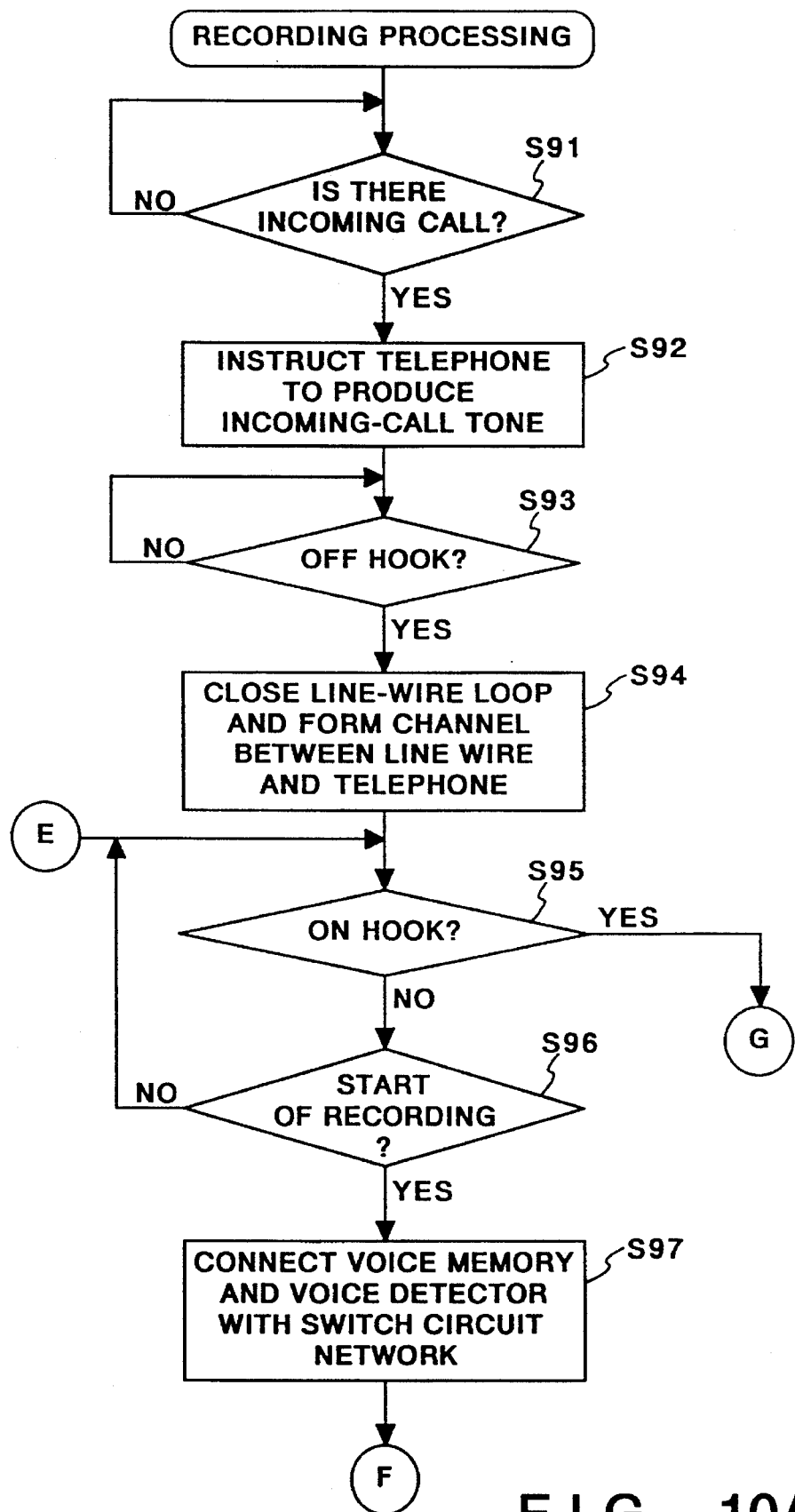
FIGS. 10A–10B is a flowchart illustrating a recording processing procedure according to the second embodiment.
Figure 10B:
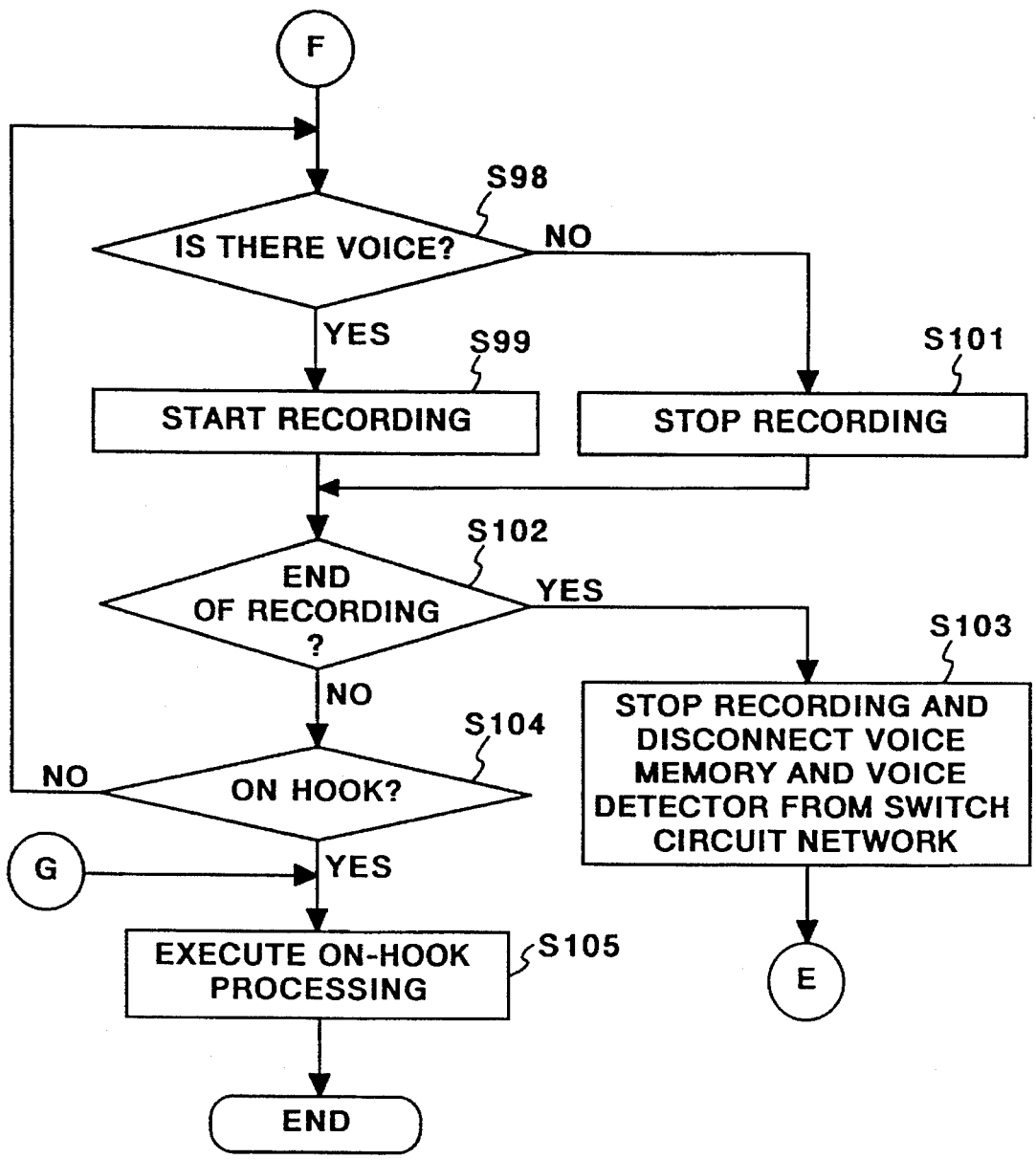

FIG. 10 is a flowchart illustrating recording processing according to the second embodiment.

The central controller 5 monitors an incoming-call signal from line wire 11 via the trunk circuit 2. When there is an incoming call (YES at step S91), a predetermined extension telephone 9 is made to issue an incoming-call tone (step S92) and the line circuit 3 is actuated to monitor whether the extension telephone 9 has been taken off the hook (step S93).

When it is detected that the extension telephone 9 has been taken off the hook, the trunk circuit 2 is actuated to close a loop in the line wire 11, and the switch circuit network 1 is controlled to connect a channel between the line wire 11 and extension telephone 9, thereby establishing a state of communication (step S94). Next, monitoring of the end of the call (step S95) and monitoring of a recording-start operation (step S96) is performed repeatedly.

When it is detected at step S95 that the extension telephone 9 has been hung up, on-hook processing is executed (step S105) and this cycle of processing is terminated.

On the other hand, when a recording-start operation from the extension telephone 9 is detected by the line circuit 3, the central controller 5 instructs the voice controller 22 to connect the switch circuit network 1 and the voice memory 21 in order that a recording may be made, and to connect the switch circuit network 1 and the voice detector 23 in order that a voice may be detected. A recording-standby state is thus established (step S97).

When the voice detector 23 detects a voice in a telephonic communication (step S98), the central controller 5 actuates the voice controller 22, which responds by starting recording (step S99). As a result, voice data from the line wire 11 is stored in the voice memory 21. However, when the voice detector 23 cannot detect a voice, the voice controller 22 is actuated to halt the recording operation (step S101).

Next, when a recording-end operation from the extension telephone 9 is detected via the line circuit 3 (step S102), the central controller 5 actuates the voice controller 22 to halt the recording operation and controls the switch circuit network 1 to break the connection between the switch circuit network 1 and voice memory 21 and between the switch circuit network 1 and voice detector 23, thereby establishing the voice data, which has been stored in the voice memory 21, as one message to be delivered (step S103). Thereafter, on-hook monitoring is performed at step S95.

On the other hand, in a case where it is detected that the extension telephone 9 has been hung up without detecting the recording-end operation (step S104), on-hook processing is executed (step S105) and this cycle of processing is terminated. When hanging up of the telephone is not detected, the program returns to step S98, where it is determined whether or not a voice is present.

It is permissible to adopt an arrangement in which, when it is detected at step S104 that the phone is on the hook, the on-hook processing is not executed immediately but is instead executed after the voice data, which has been stored in the voice memory 21, has been established as one message to be delivered.

Further, an arrangement can be adopted in which the operation of the voice detector 23 is halted, i.e., the connection between the voice detector 23 and the switch circuit network 1 is broken, the possessor of the extension telephone 9 determines himself whether there is a voice and then either starts recording or stops recording. By adopting such an arrangement, the speaker can start or stop recording based upon whether the subject matter of the conversation is important or not.

In accordance with the second embodiment, as described above, the arrangement is such that if the voice of the other party is recorded during a telephonic communication, recording can be stopped when the other party is not speaking. This makes it possible to utilize the voice storage area effectively.

[Third Embodiment]

A third embodiment of the present invention will now be described.

Figure 11:
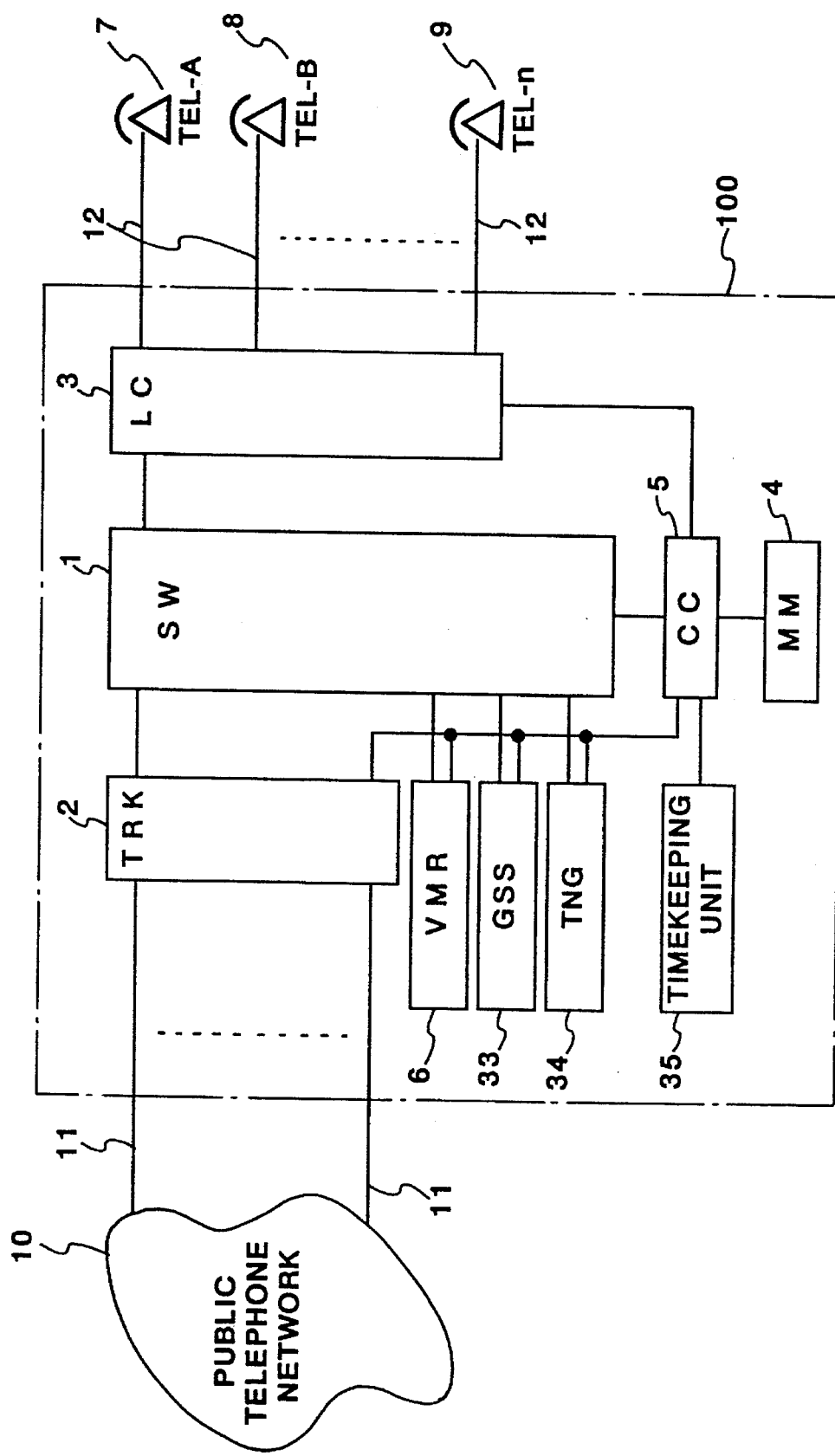
FIG. 11 is a block diagram illustrating the overall construction of a third embodiment of a telephone exchange system according to the present invention.

FIG. 11 is a block diagram illustrating the overall construction of a telephone exchange system according to the third embodiment. Elements identical with those in the telephone exchange system of the first embodiment are designated by like reference characters and need not be described again.

In FIG. 11, the telephone exchange system 100 includes a guidance signal generator 33 which, upon receiving an instruction from the central controller 5, generates a guidance signal, which is indicative of the start of recording, to the other party in a conversation via the switch circuit network 1, a sound source 34 which generates an audible tone at the extension telephones 7 through 9 and at the other party, and a timekeeping unit 35 which, in accordance with an instruction from the central controller 5, performs a timekeeping operation to inform the central controller 5 of the result of timekeeping, namely when time has run out, etc.

Figure 12:
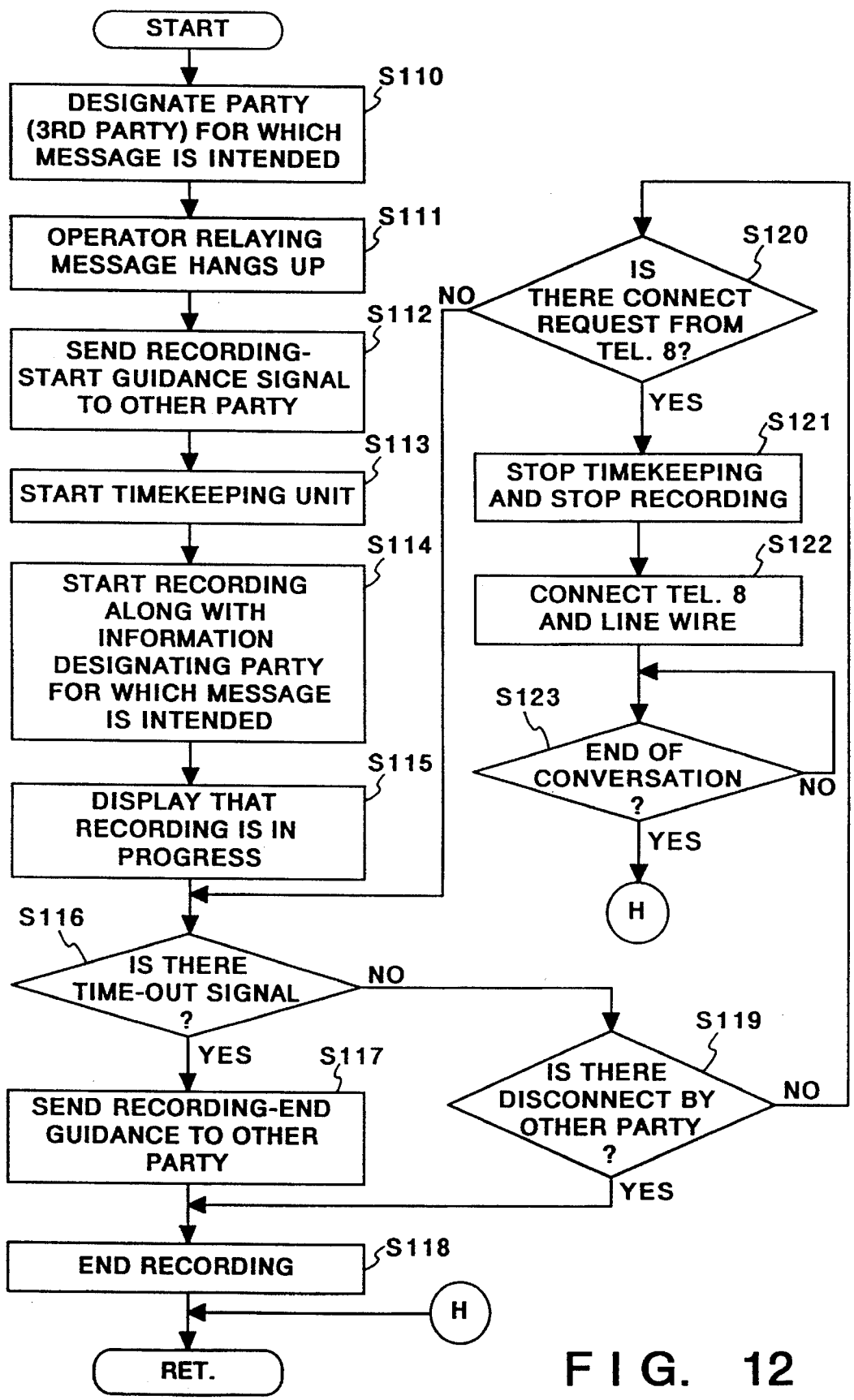
FIG. 12 is a flowchart illustrating a call processing procedure according to the third embodiment.

FIG. 12 is a flowchart illustrating a call processing procedure according to the third embodiment.

When, during communication between the line wire 11 and the extension telephone 7, the party engaged in the conversation with the extension telephone 7 reports to the speaker on extension telephone 7 that there is a message to be relayed to the possessor of the extension telephone 8, who is absent, the speaker on extension telephone 7 first presses a key for designating the extension telephone 8, namely the party for which the message is intended (step S110), and then performs an on-hook operation, such as hanging up the handset (step S111). This is the operation to relay the message.

After it is detected that the person performing the message relaying operation has hung up, the central controller 5 of the telephone exchange system 100 actuates the guidance signal generator 33 so that a guidance signal indicative of the start of recording is transmitted to the other party (step S112). Also, the timekeeping unit 35 is started (step S113). In addition, the voice message controller is actuated to start recording, and the voice is stored in the voice memory 21 along with information designating the party for which the message is intended (step S114).

Next, when the central controller 5 sends a predetermined signal to the extension telephone 8, which is the party for which the message is intended, the extension telephone 8 causes the display unit 31 to present a display to the effect that the message is being recorded (step S115).

Thereafter, the central controller 5 determines whether a time-out signal, which indicates that a preset period of time has elapsed, has been generated by the timekeeping unit 35 (step S116). If the time has run out, the guidance signal generator 33 is actuated again to transmit a guidance signal to the other party (step S117). This is guidance which indicates to this party that the time for recording is at an end. Recording is then terminated at step S118.

If the time has not run out, it is determined at step S119 by the central controller 5 whether the other party terminated the call. If the answer at step S119 is YES, then the program proceeds to step S118 and recording is ended.

However, if the other party has not terminated the call, then it is determined by the central controller 5 whether a connect request has been made by the extension telephone 8, which is the party that is to receive the message. Here the determination as to whether a connect request has been made is performed by detecting input of a password specifically assigned to each of the system extension telephone users or merely by detecting that this extension telephone has been taken off the hook.

If it is determined at step S120 that a connect request has been made, the central controller 5 halts the timekeeping operation of the timekeeping unit 35 and the recording in the voice memory 21 (step S121), and then makes a connection between the extension telephone 8 and the other party, namely the party that requested delivery of the message (step S122).

If it is determined at step S120 that a connect request has not been made, the program returns to step S116 and processing for determining whether the time-out signal is present or not is continued.

Thereafter, in a case where the possessor of extension telephone 8 learns, from the display on display unit 31, that there is a message intended for this extension telephone, the possessor performs a prescribed operation to extract and listen to the contents of the message. This operation is the same as that for requesting playback set forth in the first embodiment and need not be described again.

It should be noted that the indication given at step S115 informing of the fact that recording is in progress need not be presented using the display unit 31. For example, this indication can be made by flashing an LED belonging to a line-wire select/status display button constituting part of the control panel 25. The flashing of the LED in this case would have a period different from that indicating that a call is on hold. In addition, if the LED is capable of emitting light having two or more colors, the fact that the display is one indicating that recording is in progress can be distinguished by color.

In accordance with the third embodiment, as described above, the arrangement is such that if a party for whom a message is intended returns to the location of his or her own extension telephone while recording of the message is in progress, and if this party then realizes from the display that recording of this message is in progress and responds by issuing a connect request from his or her own extension telephone, then this extension telephone and the party attempting to convey the message are connected, thereby making it possible for the two parties to promptly carry on a conversation.

[Fourth Embodiment]

A fourth embodiment of the present invention will now be described.

FIG. 13 is a block diagram illustrating the overall construction of a telephone exchange system according to the fourth embodiment. Elements identical with those in the telephone exchange system of the first embodiment are designated by like reference characters and need not be described again.

In FIG. 13, the telephone exchange system 100 is provided with a time-stamp ROM (TS) 102 which stores time-stamp information for recording, in a manner described below, the time at which a telephonic communication starts to be recorded. Upon receiving instructions from the central controller 5, the time-stamp ROM 102 sends this time-stamp information to the voice message controller 6 via a PCM highway 115 and the switch circuit network 1. A timekeeping unit 103 successively transmits the present time to the central controller 5 in a prescribed format.

The time-stamp ROM 102 constituting part of the telephone exchange system according to the fourth embodiment will now be described in detail.

As shown in FIG. 14, PCM codes, which correspond to the actual pronunciations of times, are written in the time-stamp ROM 102 in order to record time in the form of a voice at each of addresses $1n$ through $26n$.

As shown in FIG. 14, a PCM code for pronouncing "zero" (numeral 0) is stored at address $1n$, and a PCM code for pronouncing "one" (numeral 1) is stored at address $2n$. A total of 26 PCM codes, inclusive of the pronunciations of "forty" at address $23n$ and "A.M." at address $25n$, etc., are stored in the same manner.

These PCM codes are sent to time slots, which correspond to the illustrated time-slot numbers, on the up-side of a PCM highway 115 at all times. For example, "zero" at address in is sent to time slot 0, and "P.M." at address $26n$ is sent to time slot 25.

The procedure for a series of operations from recording to playback of a telephonic communication according to this embodiment will now be described.

In a case where a telephone 111 and the extension telephone 7 are in communication in FIG. 13, the voice from telephone 111 enters the switch circuit network 1 via the public telephone network 10, trunk circuit 2 and a PCM highway 113.

The central controller 5 controls the switch circuit network 1 to connect the PCM highway 113 and a PCM highway 114 so that the voice from the telephone 111 arrives at the extension telephone 7 via the PCM highway 114, line circuit 3 and extension 12.

If the operator of extension telephone 7 performs a recording operation at the telephone 7 at this time, the line circuit 3 senses this operation and sends this information to the central controller 5. When the central controller 5 receives this information, the present time is read from the timekeeping unit 103.

Figure 15A:
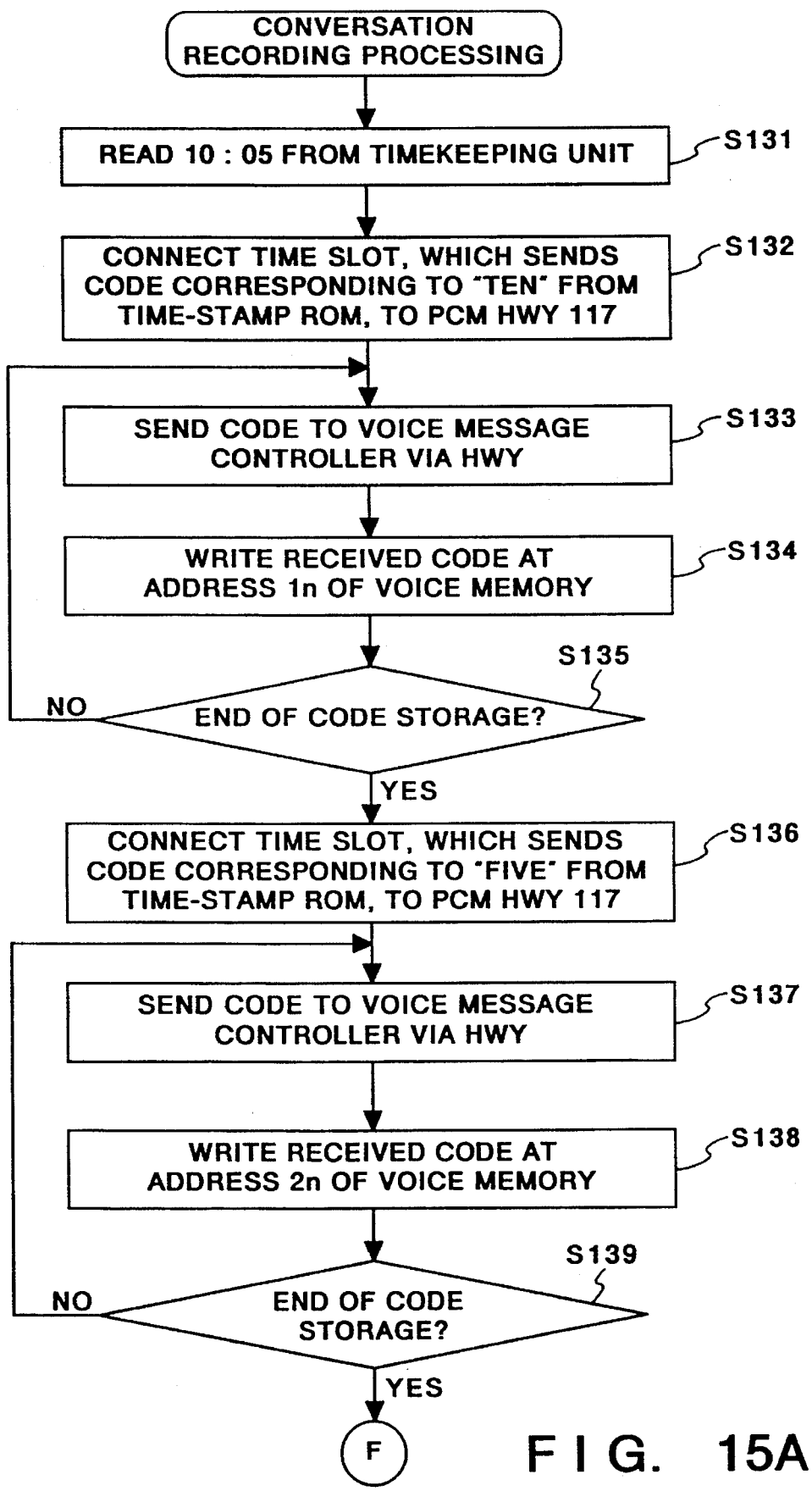
FIGS. 15A–15B is a flowchart illustrating a call recording processing procedure according to the fourth embodiment.
Figure 15B:
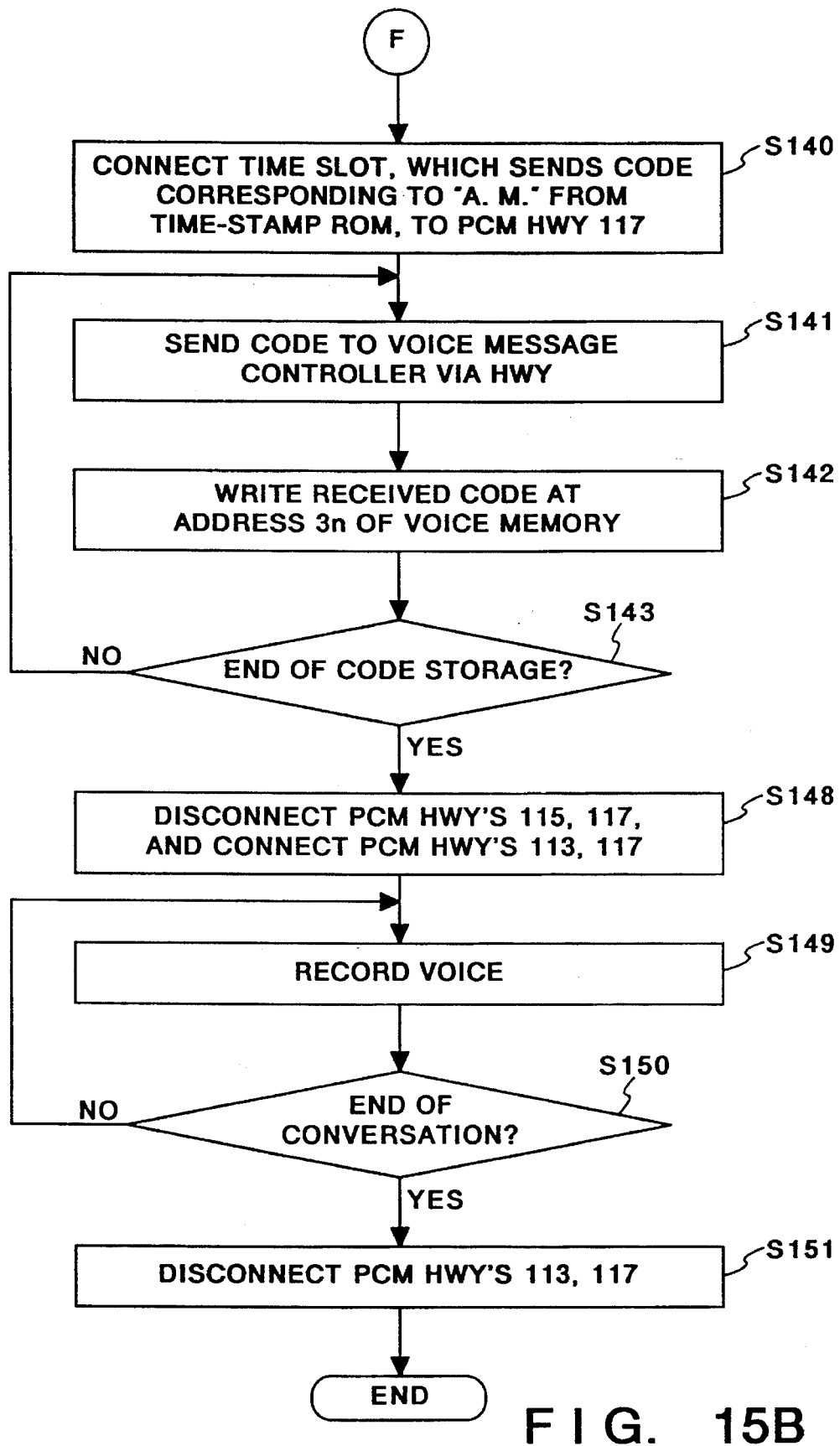

Reference will now be had to FIG. 15 to describe conversation recording processing which includes the recording of recording starting time in a case where the time read out from the timekeeping unit 103 is 10:05 A.M., by way of example.

After 10:05 A.M. is read from the timekeeping unit 103 (step S131), the central controller 5 controls the switch circuit network 1 so that the time slot 10, which transmits the PCM code for pronouncing "ten" stored at address $11n$ of the time-stamp ROM 102, is connected to a PCM highway 117 (step S132), and this code is sent to the voice message controller 6 (step S133).

When the voice message controller 6 receives the PCM code from the PCM highway 117, the controller stores this PCM code at a predetermined address of the voice memory 21 (step S134).

FIG. 16 is a diagram showing the contents of the voice memory in which the code information is stored. Here the PCM code for "ten" is stored at address $1n$.

When it has been determined (step S135) that storage of the code information has ended, the central controller 5 controls the switch circuit network 1 to connect time slot 5, which transmits the PCM code for pronouncing "five", to the PCM highway 117 (step S136). This code is sent to the voice message controller 6 (step S137). Just as in the case of "ten" described above, the voice message controller 6 stores the PCM code for "five" at address $2n$ of the voice memory (step S138).

Thereafter, and in similar fashion, the time slot 24 which transmits the PCM code for pronouncing "A.M." is connected to the PCM highway 117, and this code is stored at address 3n of the voice memory (steps S140 through S143).

When all of the time-stamp information has been stored in the voice memory, the central controller 5 controls the switch circuit network 1 to open the bus between the PCM highway 115 of the time-stamp ROM 102 and the PCM highway 117 of the voice message controller 6, after which the PCM highway 113 and PCM highway 117 are connected (step S148) to preform recording of a telephonic communication (step S149).

When it is determined that the telephone 111 on the side of the other party to the communication has been hung up, the central controller 5 controls the switch circuit network 1 to open the PCM highway 117 leading to the voice message controller 6 (step S151).

Next, when the operation for recording the telephonic communication is performed at the extension telephone in the manner described above, the time-stamp information is stored from the address which follows that in the voice memory used previously as a storage area, and recording of the telephonic communication is then carried out.

Thus, the recording starting time is always recorded in the form of a voice at the beginning of the recording of a telephonic communication.

The operation for playing back the recorded communication will now be described.

FIG. 17 is a flowchart illustrating the operation for playing back the contents of a recording.

First, when a prescribed playback operation is performed at the extension telephone 7, the line circuit 3 serving as the extension interface detects that this playback operation has occurred and transmits this information to the central controller 5 (step S161). Upon receiving this information, the central controller 5 controls the switch circuit network 1 to connect the PCM highway 117, which leads to the voice message controller 6, with the PCM highway 114 (step S162). At the completion of this connection operation, the voice memory 21 is actuated so that the PCM codes stored there are read out sequentially starting from the smaller-number addresses and transmitted to the PCM highway 114 (step S163).

When the line circuit 3 receives the PCM codes, the type of extension telephone is discriminated (step S164). If the extension telephone is of the analog type, the PCM codes are converted into analog voice signals by a D/A converter (not shown)(step S165), and these analog signals are delivered to the extension telephone. If the extension telephone is of the digital type, the PCM codes are transmitted to the extension telephone as is. In case of the digital extension telephone, the PCM codes are D/A converted internally (step S166). Then the extension telephone outputs the voice signal (step S167).

As a result, the operator of the extension telephone 7 is capable of hearing a time-stamped recorded message, namely a message "10:05 A.M.; Good day!" according to the example mentioned above.

In accordance with this embodiment, as described above, the time at the start of recording of a telephonic communication is recorded in the form of a voice at the beginning of the recorded communication, thereby making it possible to determine, at playback, when the recording started. This enhances the reliability of the recorded information.

<Modification>

Figure 18B:
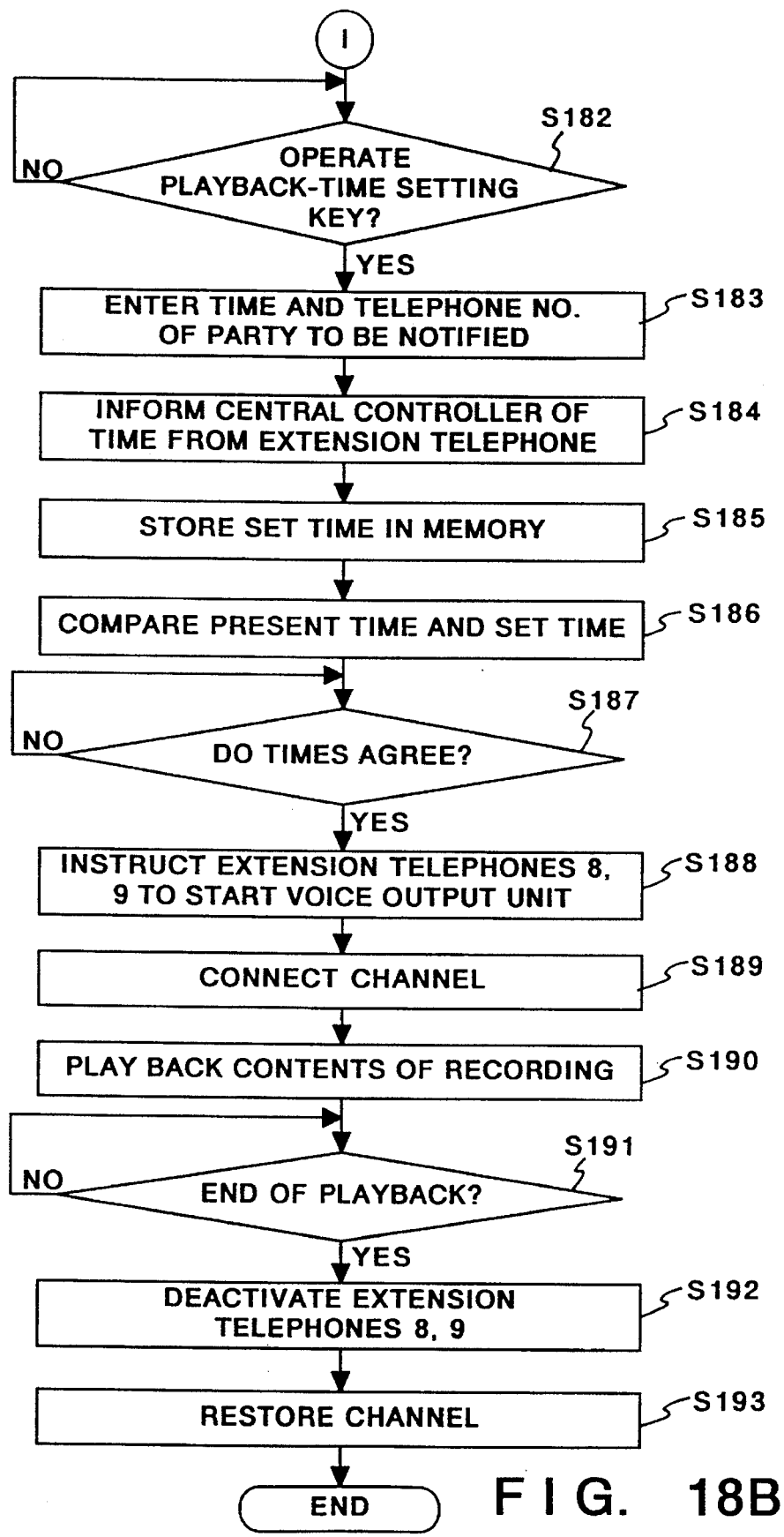

The details of a modification of the fourth embodiment will be described in accordance with the flowchart shown in FIG. 18.

When, in the telephone exchange system shown in FIG. 13, the extension telephone 7 is taken off the hook (step S171), the CPU 27 (see FIG. 2A) within this extension telephone 7 detects the fact and so informs the central controller 5 via the line circuit 3 serving as the extension interface (step S172).

The central controller 5 controls the switch circuit network 1 to connect a sound source (not shown) to the extension 12 via the line circuit 3, thereby transmitting a dial tone to the extension telephone 7 (step S173). The operator of the extension telephone 7 verifies the output of this dial tone from the voice output unit 29 (FIG. 2A).

Next, the operator enters the telephone number of the other party from the control panel 25 and, when the other party responds, performs a recording operation in order to record the telephonic communications (step S174). The CPU 27 of the telephone detects the recording operation and so informs the central controller 5 (step S176) in the same way as when the telephone was taken off the hook.

In response, the central controller 5 places the voice message controller 6 in a recording-enable state (step S177) and controls the switch circuit network 1 to connect the extension 12 to the voice message controller 6.

Thereafter, the voice of the operator of extension telephone 7 is recorded in the voice memory 21 within the voice message controller 6 via the voice input unit 28, speech network 30, communication interface 24, extension 12 and switch circuit network 1 (step S178).

Next, when the extension telephone 7 is hung up (step S179), the CPU 27 of this telephone detects the fact and so informs the central controller 5 (step S180). The latter regards this as being the end of recording and severs the channel between the voice message controller 6 and the extension 12 (step S181).

Next, when the operator of the extension telephone 7 performs a prescribed playback-time setting operation (step S182) using the control panel 25 and enters the present time as well as the telephone number of the party to be notified of the particular business (step S183), the CPU 27 communicates this information to the central controller 5 (step S184). The latter then stores the set time in memory 4 (step S185).

The central controller 5 reads the present time from the timekeeping unit 103 and compares this time with the time that has been stored in the memory 4 (step S186). If the two agree (YES at step S187), the extension telephones that are the parties to be notified, e.g., the extension telephones 8, 9, are instructed to activate their respective voice output units 29 (step S188).

Further, the central controller 5 controls the switch circuit network 1 to connect the voice message controller 6 with the extension telephones 8, 9 (step S189) and actuates the voice memory 21 to play back the contents of the recording. As a result, the voice from the extension telephone 7 that has been recorded in the voice memory 21 is transmitted to the extension telephones 8, 9 via the switch circuit network 1 and extensions 12, whereby the voice is outputted by the voice output units 29 of the respective extension telephones (step S190).

When the voice message controller 6 informs the central controller 5 of the fact that the entire message has been played back, or when the recording time and the playback time agree, this is regarded as being the end of playback (step S191) and the CPU's of the extension telephones 8, 9 are so informed. When this is done, the CPU's of the extension telephones 8, 9 deactivate the respective voice output units 29 (step S192). Thereafter, the central controller 5 again controls the switch circuit network 1 to open the channel connecting the voice message controller 6 with the extension telephones 8, 9, thereby restoring the initial state (step S193).

By virtue of the foregoing operations, the operator of the extension telephone 7 is capable of recording an item of business at any time, and of playing back the recorded message at any set time and sending its contents to the users of the extension telephones 8 and 9.

In the modification described above, the playback time is set after the item of business to be conveyed is recorded. However, it can be arranged to record the item of business after the playback time is set. In addition, an arrangement can be adopted in which the voice played back is outputted not only to the extension telephones 8, 9 but also to its own telephone (extension telephone 7) in order that the contents of the recording may be confirmed. Furthermore, the extension telephone which outputs the played-back voice can be all extension telephones in the system. Alternatively, extension telephones can be divided into groups and all of the extension telephones in a specific group can be adopted as extension telephones capable of outputting a played-back voice.

In accordance with this modification, as described above, a voice recorded at any desired time can be transmitted to a plurality of parties at any set time as a service function in a so-called general broadcast- or general calling-type telephone exchange system. Accordingly, the labor entailed by transmitting a message indicating the start of a conference or the like to several parties one at a time is curtailed. If, at the time it is decided to hold a conference, a matter of business to this effect is recorded and the time at which the conference is to start is set in advance, the matter of business can be conveyed to the other parties reliably at the set time.

As many apparently widely different embodiments of the present invention can be made without departing from the spirit and scope thereof, it is to be understood that the invention is not limited to the specific embodiments thereof except as defined in the appended claims.

What is claimed is:

1. A telephone exchange system capable of accommodating a plurality of extension telephones, comprising:

memory means for storing a voice message, and designating data which designates a time at which the voice message is played back; and control means from controlling writing of a voice message in said memory means and reading of a voice message out of said memory means;

wherein said control means enables voice-outputting means of said plurality of extension telephones at the time designated by the designating data while reading the voice message out of said memory means and transmitting said voice message to the enabled voice-outputting means of the plurality of extension telephones.

2. The telephone exchange system according to claim 1, wherein said control means has timekeeping means, said control means reading the voice message out of said memory means and transmitting said voice message to the extension telephone when a time clocked by said timekeeping means and the time designated by said designating data agree.

3. A telephone exchange system accommodating a plurality of central office lines and a plurality of telephones and having recording means, which are shared by said plurality of telephones, for recording a voice during a telephonic communication, comprising:

recording control means for controlling starting and stopping of recording of the voice on said recording means;

managing means for managing the recording operation of said recording means;

specific-information storing means for storing, based upon results of management performed by said managing means, at least information designating a recording area of said recording means, information specifying one or more of the plurality of telephones, recording starting-position information and recording end position information as information specifying a recording; and altering means for altering information, which has been stored in said specific-information storing means, in accordance with the recording operation of said recording means under the management performed by said managing means.

4. The telephone exchange system according to claim 3, wherein said recording control means has playback control means for playing back the recording, which has been recorded on said recording means, in response to a playback request, when the information stored in said specific-information storing means satisfies predetermined recording area designating, telephone specifying, recording starting position and recording end position information conditions.

5. The telephone exchange system according to claim 3, wherein said recording control means has transfer control means for transferring the recording, which has been recorded on said recording means, in response to a transfer request, when the information stored in said specific-information storing means satisfies predetermined recording area designating, telephone specifying, recording starting position and recording end position information conditions.

6. The telephone exchange system according to claim 4, wherein when a telephone designation in the playback request and the telephone-specifying information agree, said playback control means plays back a recording, playback of which has been requested, on a telephone specified by the telephone-specifying information.

7. The telephone exchange system according to claim 5, wherein when a telephone designation in the transfer request and the telephone-specifying information agree, said transfer control means transfers a recording, transfer of which as been request, to a telephone specified by the telephone-specifying information altered by said altering means.

8. The telephone exchange system according to claim 5, wherein after the recording is transferred in response to the transfer request, said transfer control means erases the recording in said recording means.

9. The telephone exchange system according to claim 3, wherein said recording control means has voice detecting means for detecting whether a voice is present during a telephone call, recording of the voice on said recording means being started and stopped based upon results of detection by said voice detecting means.

10. The telephone exchange system according to claim 9, wherein said recording control means records the voice on said recording means only when said voice detecting means detects that the voice is present.

11. A telephone exchange system accommodating a plurality of central office lines and a plurality of telephones and having recording means, which are shared by said plurality of telephones, for recording a voice during a telephonic communication, comprising:

recording sensing means for sensing whether there is a recording for a specific telephone in said recording means;

display means for displaying, on said specific telephone, and based upon results of sensing performed by said recording sensing means, a message to the effect that there is a recording for this specific telephone;

acknowledging means for acknowledging a connect request from said specific telephone while said recording means is recording the voice during the telephonic communication; and connection control means for connecting the telephone which has issued the connect request and the calling party when said acknowledging means acknowledges the connect request.

12. The telephone exchange system according to claim 11, wherein said connection control means controls to stop the recording of the voice on said recording means after said connection control means connects the telephone which has issued the connect request and the calling party.

13. A telephone exchange system comprising:

first memory means in an exchange for storing a voice message;

connecting means for connecting a plurality of telephones; and transfer means for transferring the voice message stored in said first memory means in the exchange to a first telephone of the plurality of telephones, wherein said transfer means transfers the voice message stored in said first memory means in the exchange to second memory means in a second telephone of the plurality of telephones, said second telephone being specified by the first telephone.

14. A method of operating a communication system for communicating with a plurality of terminals comprising the steps of:

storing a voice message into a memory, said voice message having a designated one of the plurality of terminals at which the voice message is played back, controlling said designated one of the plurality of terminals so that a user of said designated one of the plurality of terminals can notice that the voice message is being stored, and connecting a sender of the voice message who is being connected to the memory and is storing the voice message, to said designated one of the plurality of terminals according to a request received from said designated one of the plurality of terminals.

15. The method according to claim 14, wherein in the controlling step said designated one of the plurality of terminals is informed to visibly indicate that the voice message is being stored.

16. A telephone exchange system comprising:

memory means for storing a voice message;

connecting means for connecting a selected one of a plurality of extensions and said memory means to a communication partner via an external line; and control means for controlling said connecting means so as to connect a designated one of the plurality of extensions at which the voice message which is being stored should be played back and the communication partner according to a request of said designated one of the plurality of extensions in a state in which the communication partner is storing the voice message into said memory means when said memory means and the communication partner are connected by said connecting means.

17. The telephone exchange system according to claim 16, wherein said control means comprises informing means for informing said designated one of the plurality of extensions of the fact that said memory means is storing the voice message for said designated one of the plurality of extensions.

18. The telephone exchange system according to claim 16, wherein the request of said designated one of the plurality of extensions is an off-hook operation.

19. A telephone exchange system capable of accommodating a plurality of extension telephones, comprising:

memory means for storing a voice message; and control means for controlling writing of a voice message in said memory means and reading of a voice message out of said memory means, wherein said control means writes specifying data into a management table in a form correlated with an address of said memory means in which said voice message is stored, said specifying data being used to specify an extension telephone to which said voice message is to be transferred, and said control means rewrites said specifying data, which has been written in management table in a form correlated with the address, upon an instruction from said specified extension telephone, reads said voice message out of said memory means in accordance with the address, and transmits said voice message to an extension telephone specified by said rewritten specifying data.

20. A telephone exchange system according to claim 19, wherein said control means selects, based upon said specifying data, from a plurality of voice messages stored in said memory means, a voice message to be transmitted to an extension telephone requesting playback.

21. A telephone exchange system according to claim 19, wherein said control means writes designating data which designates a time, at which said voice message is to be played back and one of the plurality of extension telephones to which said voice message is to be played back, in said memory means in a form correlated with said voice message, and said control means reads said voice message out of said memory means and transmits said voice message to an extension telephone designated by said designating data at the time designated by said designating data.

22. A telephone exchange system according to claim 21, wherein said control means has timekeeping means, said control means reading said voice message out of said memory means and transmitting said voice message to said extension telephone designated by said designating data when a time clocked by said timekeeping means and the time designated by said designating data agree.

23. A telephone exchange system according to claim 22, further comprising converting means for converting the time clocked by said time keeping means into an audible voice.

24. A telephone exchange system according to claim 23, wherein said control means writes the time which has been converted into the audible voice into said memory means, whenever a voice message is written into said memory means.

25. A telephone exchange system according to claim 19, wherein said memory means comprises specific-information storing means for storing said specifying data, recording area information, recording starting-position information and recording end-position information as specific information specifying said voice message, said specific information being rewritten in accordance with a voice message written by said control means.

26. A telephone exchange system according to claim 25, wherein said control means comprises voice control means for playing back said voice message which has been stored in said memory means, in response to a playback request, when said specific information stored in said specific-information storing means satisfies predetermined conditions.

27. A telephone exchange system according to claim 25, wherein said control means comprises transfer control means for transferring said voice message, which has been stored in said storing means, in response to a transfer request, when said specific information stored in said specific-information storing means satisfies predetermined conditions.

28. A telephone exchange system according to claim 26, wherein when said playback request and said specific information agree, said voice control means plays back a voice message, the playback of which has been requested, on an extension telephone specified by said specifying data.

29. A telephone exchange system according to claim 27, wherein when said transfer request and said specific information agree, said transfer control means transfers a voice message, the transfer of which has been requested, to an extension telephone specified by said rewritten specifying data.

30. A telephone exchange system according to claim 27, wherein after said voice message is transferred in response to said transfer request, said transfer control means erases said voice message in said storing means.

31. A telephone exchange system according to claim 25, wherein said control means has voice detecting means for detecting whether a voice is present during a telephone call, writing of said voice in said memory means being started and stopped based upon results of detection by said voice detecting means.

32. A telephone exchange system according to claim 31, wherein said control means stores said voice message in said memory means only when said voice detecting means detects that said voice message is present.

33. A telephone exchange system according to claim 19, further comprising sensing means for sensing whether a voice message for a specific extension telephone is stored in said memory means, display means for displaying a message on said specific extension telephone, based upon the results of sensing performed by said sensing means, in order to indicate that there is a voice message for said specific extension telephone, acknowledging means for acknowledging a connect request from said specific extension telephone while said voice message is being written into said memory means during a telephone conversation, and connection control means for connecting the extension telephone which has issued said connect request and calling party when said acknowledging means acknowledges said connect request.

34. A telephone exchange method for operating a plurality of telephones, comprising the step of:

storing a voice message in a memory means;

writing specifying data for specifying a telephone, to which said voice message is to be transferred, into a management table in a form correlated with an address of said memory means in which said voice message is stored; and rewriting said specifying data written in said management table in a form correlated with the address, upon an instruction from said specified telephone, reading said voice message out of said memory means in accordance with the address, and transmitting said voice message to a telephone specified by said rewritten specifying data.

35. A voice message transfer method for transferring messages, comprising the steps of:

making a management table in which a first destination and a message, included in messages, to be transmitted to a first destination are specified; and remaking the management table, upon an instruction from the first destination, such that a second destination is specified for transferring the message.

36. The method according to claim 35, wherein the management table, including destination data for specifying the first destination and message specifying data for specifying the message, is made in said making step, and the destination data is rewritten in said remaking step.

37. The method according to claim 35, wherein the management table, including position data indicating a position where the message is stored, is made in said making step.

38. A message transfer method for transferring messages, comprising the steps of:

making management data for specifying a first destination and a message included in messages, to be transmitted to the first destination; and remaking the management data, upon an instruction from the first destination, such that a second destination is specified for transferring the message.

39. The method according to claim 38, wherein the management data, including destination data for specifying the first destination and message specifying data for specifying the message, is made in said making step, and the destination data is rewritten in said remaking step.

40. The method according to claim 38, wherein the management data, including position data indicating a position where the message is stored, is made in said making step.

41. A message transfer method for transferring messages, comprising the steps of:

making a management table in which a first destination and a message, included in messages, to be transmitted to the first destination are specified;

transferring the message to the first destination based on the management table made in said making step;

remaking the management table, upon an instruction from the first destination, such that a second destination is specified for transferring the message; and transferring the message to the second destination based on the management table remade in said remaking step.

42. The method according to claim 41, wherein the management table, including destination data for specifying the first destination and message specifying data for specifying the message, is made in said making step, and the destination data is rewritten in said remaking step.

43. The method according to claim 41, wherein the management table, including position data indicating a position where the message is stored, is made in said making step.

* * * * *

UNITED STATES PATENT AND TRADEMARK OFFICE
CERTIFICATE OF CORRECTION

PATENT NO. : 5,586,172

DATED : December 17, 1996

INVENTOR(S) : SHIEGEKI SAKURAI ET AL.

It is certified that error appears in the above-identified patent and that said Letters Patent is hereby corrected as shown below:

COLUMN 8

Line 3, "abovementioned" should read --above-mentioned--.

COLUMN 9

Line 37, "or" should read --of--.

COLUMN 14

Line 16, "in" should read --1n--.

COLUMN 18

Line 46, "as" should read --has--; and

Line 47, "request," should read --requested,--.

Signed and Sealed this

Sixteenth Day of September, 1997

Attest:

BRUCE LEHMAN

*Attesting Officer*        *Commissioner of Patents and Trademarks*